(12) United States Patent
Thomas et al.

(10) Patent No.: US 9,089,903 B2
(45) Date of Patent: Jul. 28, 2015

(54) USE OF LIQUID METAL FILTERS IN FORMING MATRIX DRILL BITS

(71) Applicant: Halliburton Energy Services, Inc., Houston, TX (US)

(72) Inventors: Jeffrey Thomas, Magnolia, TX (US); Clayton Ownby, Houston, TX (US); Ron Joy, Katy, TX (US); Gary Weaver, Montgomery, TX (US); Seth Anderle, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 6 days.

(21) Appl. No.: 14/081,031

(22) Filed: Nov. 15, 2013

(65) Prior Publication Data
US 2014/0069601 A1    Mar. 13, 2014

Related U.S. Application Data

(62) Division of application No. 13/300,951, filed on Nov. 21, 2011, now Pat. No. 8,656,983.

(60) Provisional application No. 61/416,056, filed on Nov. 22, 2010.

(51) Int. Cl.
*B22D 19/06* (2006.01)
*B22D 19/14* (2006.01)
*B23B 51/00* (2006.01)
*B22F 3/00* (2006.01)
*B22F 3/26* (2006.01)
*C22C 29/08* (2006.01)
*B22F 5/00* (2006.01)

(52) U.S. Cl.
CPC ............... *B23B 51/00* (2013.01); *B22D 19/06* (2013.01); *B22F 3/004* (2013.01); *B22F 3/26* (2013.01); *C22C 29/08* (2013.01); *B22F 5/007* (2013.01)

(58) Field of Classification Search
CPC ........ B22D 19/06; B22D 19/14; B22F 3/004; B23B 51/00
USPC ............ 164/97, 112, 134, 332, 333, 334, 358
See application file for complete search history.

(56) References Cited

U.S. PATENT DOCUMENTS 8,656,983 B2    2/2014    Thomas et al.

*Primary Examiner* — Kevin P Kerns
(74) *Attorney, Agent, or Firm* — McDermott Will & Emery LLP; Alan Bryson

(57) ABSTRACT

Of the many embodiments provided, one embodiment is a drill bit mold assembly comprising: a mold having a bottom and at least one side; a core centrally disposed within the mold; and a filter disposed above the bottom of the mold and within a space formed between the at least one side of the mold and the core.

13 Claims, 26 Drawing Sheets

USE OF LIQUID METAL FILTERS IN FORMING MATRIX DRILL BITS

CROSS REFERENCE TO RELATED APPLICATION

The present application is a divisional of and claims priority to U.S. Pat. No. 8,656,983 issued on Feb. 25, 2014, which claims priority to U.S. Provisional Patent App. Ser. No. 61/416,056, filed on Nov. 22, 2010.

BACKGROUND

The present invention relates to drill bits and methods of forming drill bits, and more particularly, to methods and molds for reducing the amount of inclusions present in drill bits when formed.

In traditional casting processes, a furnace melts a metal, and the molten metal is then transferred, typically to another vessel, such as, for example, a ladle, to transport it to the forming means, such as, a mold. The furnace can also act as a holding location for the molten metal to allow any trapped gases and low density impurities to migrate to the surface. A typical mold used in a casting process may include a number of components for forming a metallic piece. For example, a common gating system can comprise a pouring cup connected to a downsprue, which feeds liquid metals to runners and runner extensions that feed into the final mold shape. As used herein, "casting" and "casting processes" refer to this traditional process in which metal is melted at one location and transferred to a second forming means, such as a mold.

In the casting of metals, it is generally desirable to separate exogenous (i.e., originating from sources external to the melt) intermetallic and non-metallic inclusions from the molten metal. Such inclusions can result, in molten metals, from impurities included in the raw materials used to form the melt, from slag, dross and oxides which form on the surface of the melt as a result of reactions with atmospheric gases such as oxygen, and from small fragments of the refractory materials that are used to form the chamber or vessel in which the molten metal melt is formed. Such inclusions, if not removed from the molten state of the metal, can result in weakened points in the final formed and solidified metal body, which is the eventual downstream end product of the melting operation.

Typically, in a metal casting process, the molten metal is formed in a furnace wherein the constituent components are added in the form of unmelted scrap and/or refined virgin metal, deoxidizing agents in various forms (both solid and gaseous or a combination of both) and alloying elements. Very light (less dense) solids and gases tend to migrate to the surface of the melt where they either effervesce or float in combination with partially and completely solidified oxides known variously as slag and dross. Slag can be skimmed off of the molten metal before the molten metal is removed from the furnace, removing a majority of the impurities trapped in the slag. Further, a second slag can form in the ladle and be skimmed off for additional inclusion removal prior to pouring the molten metal into the casting. The higher density impurities in the melt tend to remain in some degree of suspension in the liquid phase of the metal, or melt, as the fluid flow convection currents are generated within that melt by the heating means applied by the melting furnace. Flux can be used to chemically bind with some inclusions, allowing them to float or otherwise be removed from the liquid phase. Those inclusions which are chemically inert may not be affected by the flux and may therefore remain suspended in the liquid phase of the metal. In the casting process, filters have also been used to remove larger inclusions from the molten metal as it passes into the mold. In such processes, the pressure provided by the head of the downsprue or some additional pressurization unit may be used to provide the driving force necessary to pass the liquid metal through a filter and into the mold.

For the purposes of this invention, casting should be distinguished from infiltration (a means of forming a metal object wherein a molten metal binder is wicked into contact with a powder present in the mold) processes. Typical casting processes can involve multiple operations that allow for multiple locations and steps during which inclusions can be removed. Conversely, operations involving infiltration are more single-step in orientation, and therefore, do not typically include more than one step during which the inclusions could be removed. This makes using a mechanical means to remove inclusions more difficult in infiltration processes.

SUMMARY OF THE INVENTION

The present invention relates to drill bits and methods of forming drill bits, and more particularly, to methods and molds for reducing the amount of inclusions present in drill bits when formed.

An embodiment of the present invention comprises a drill bit mold comprising: a mold having a bottom and at least one side; a core centrally disposed within the mold; and a filter disposed above the bottom of the mold and within a space formed between the at least one side of the mold and the core.

Another embodiment of the present invention comprises a drill bit mold comprising: a mold having a bottom and at least one side; a core centrally disposed within the mold; and a binder bowl disposed on top of the mold and having a filter incorporated therein.

Still another embodiment of the present invention comprises a method comprising: providing a drill bit mold comprising: a funnel; a mold disposed below the funnel and engaged with the bottom of the funnel; and a filter disposed above the mold and within the funnel; placing a matrix powder and a steel blank within the mold; placing a binder material above the filter; melting at least a portion of the binder material to form a molten binder material; and allowing the molten binder material to pass through the filter and infiltrate the matrix powder.

Yet another embodiment of the present invention comprises an apparatus comprising: a binder bowl with an opening in a bottom of the binder bowl; and a filter disposed within the opening in the bottom of the binder bowl.

In another embodiment of the present invention, a drill bit mold assembly may comprise a mold cavity having disposed therein an endpoint of a flow path for molten binder material; and at least one filter disposed along the flow path before the endpoint of the flow path.

In another embodiment of the present invention, a drill bit mold assembly may comprise a mold cavity having disposed therein an endpoint of a flow path for molten binder material; at least a portion of at least one piece disposed in the mold cavity; at least one filter disposed along the flow path before the endpoint of the flow path; and a binder bowl operably attached to the mold cavity and disposed along the flow path at or before at least one filter.

In another embodiment of the present invention, a drill bit mold assembly may comprise a mold cavity having disposed therein an endpoint of a flow path for molten binder material, the mold cavity formed by at least one inner wall of the drill bit mold assembly and an outer wall of a piece disposed in the drill bit mold assembly; and at least one filter disposed along the flow path before the endpoint of the flow path.

In another embodiment of the present invention, methods may comprise providing a drill bit mold assembly comprising: a mold cavity having disposed therein an endpoint of a flow path for a molten binder material, and at least one filter disposed along the flow path before the endpoint of the flow path; placing a matrix powder within the mold cavity; placing a binder material along the flow path before the filter; melting at least a portion of the binder material to form the molten binder material; and passing the molten binder material through the filter so as to infiltrate the matrix powder.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1:
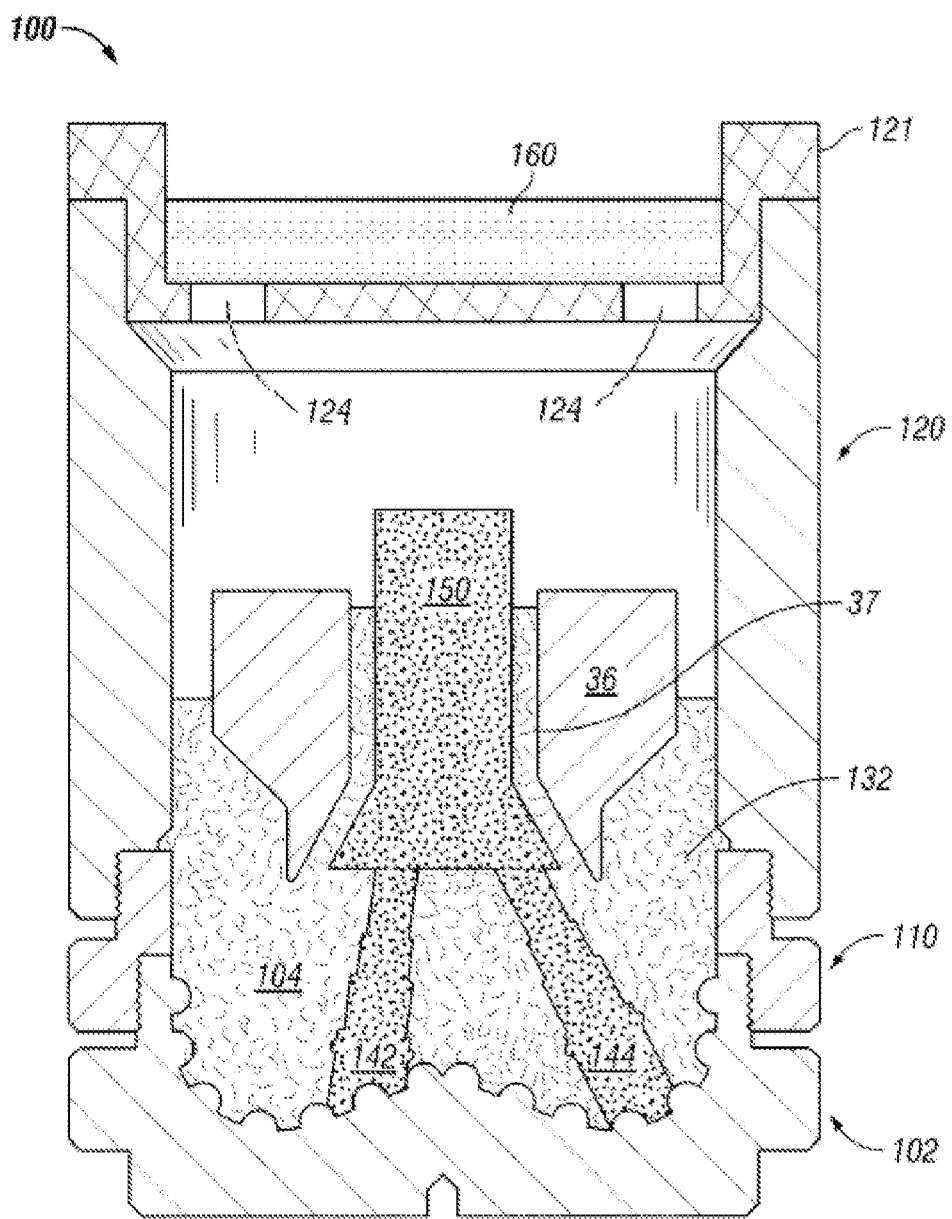
FIG. 1 is a schematic drawing in section with portions broken away showing one example of a mold assembly satisfactory for forming a matrix drill bit in accordance with the teachings of the present disclosure.

The present invention relates to matrix drill bits and methods of forming matrix drill bits, and more particularly, to methods and molds for reducing the amount of inclusions present in matrix drill bits when formed.

The use of a flux in an infiltration process can help prevent inclusions from being carried into an infiltrated drill bit. The flux can bind with oxides such as slag and/or dross, allowing the inclusions to float and be removed by machining off the top of the bit, commonly referred to as the "binder head." Carrying out an infiltration process without flux typically requires the use of a protective atmosphere during the casting process (e.g., a vacuum or inert) that can be expensive and require specialized processing equipment. Without intending to be limited by theory, the inventor has discovered that while the use of flux is generally considered to be beneficial, the use of a flux can result in some flux being carried into an infiltrated matrix powder. As a result of incomplete separation of flux from the infiltrated drill bit, inclusions can result within the final drill bit itself.

While many advantages of the present invention exist, only a few are discussed herein. In some embodiments, the drill bit molds described herein may comprise a filter that when used to form matrix drill bits can remove at least a portion of the inclusions that may lead to defects in the final matrix drill bits produced from the molds. Such inclusions can detrimentally affect the mechanical properties of the final matrix drill bits by, inter alia, acting as discontinuities in the metal matrix. The term "inclusion" as used herein can refer to any impurities present in the binder, the matrix powder, or any other components of the matrix drill bit, and may include, but is not limited to, slag, dross, oxides, silicates, and sulfides in the binder, oxides, silicates, and sulfides formed during infiltration, and small fragments of the materials used to form the mold. For example, the use of a flux may result in the formation of inclusions that may typically float and solidify at the top of a mold where it can be removed from the final product. However, incomplete separation of flux from a matrix drill bit can result in inclusions within the final drill bit itself. In some embodiments, the use of a mold comprising a filter may allow for the reduction or elimination of the flux from the matrix drill bit infiltration process, and consequently, the reduction or prevention of any impurities entering the matrix drill bit.

In some embodiments of the present invention, a drill bit mold assembly may comprise a mold cavity having disposed therein an endpoint of a flow path for molten binder material and at least one filter disposed along the flow path before the endpoint of the flow path. As used herein, the terms "mold cavity" or "cavity" refers to the space within the drill bit mold assembly that defines the shape of the final product. As used herein, the term "flow path" refers to a path that a fluid may travel, e.g., a flow path for molten binder is the path the binder may travel once molten during the production of a downhole tool, e.g., a drill bit body. Said flow path generally has an endpoint where the fluid, e.g., molten binder, comes to rest. It should be noted that the terms "drill bit mold assembly" and "matrix drill bit mold" may be used interchangeably herein.

In an embodiment of the present invention, a matrix drill bit mold according to the present invention comprises a mold having a bottom and at least one side; a core centrally disposed within the mold; and a filter disposed above the bottom of the mold and within a space formed between the at least one side of the mold and the core. The terms "matrix drill bit" and "matrix drill bits" may be used in this application to refer to "rotary drag bits," "drag bits," "fixed cutter drill bits" or any other drill bit incorporating teaching of the present disclosure. Such matrix drill bits may be used to form well bores or boreholes in subterranean formations. The matrix drill bit mold may optionally comprise additional components as necessary to facilitate the formation of matrix drill bits of various shapes.

In some embodiments of the present invention, a drill bit mold assembly may be formed by one or more piece. Examples of suitable pieces and/or components of a drill bit mold assembly may include, but not be limited to, a bottom, walls, sides, ledges, cores, metal blanks, legs, mold inserts, binder bowls, funnels, gauge rings, or any combination thereof. One skilled in the art should understand the operably connectivity of said pieces, the configurations to place pieces in the drill bit mold assembly, and the configurations where said pieces form the drill bit mold assembly. In addition, a drill bit mold assembly may be optionally assembled from various components to more easily form complex matrix drill bit shapes by creating a more complex mold cavity. In some embodiments, a mold cavity may be formed by two or more pieces being operably connected. In some embodiments, a mold cavity may be formed by the inner wall of a drill bit mold assembly and an outer wall of a piece disposed in the drill bit mold assembly.

A wide variety of molds may be satisfactorily used to form matrix drill bits in accordance with the teachings of the present disclosure. Mold assembly 100 as shown in FIGS. 1-13 represents only examples of mold assemblies satisfactory for use in forming a matrix drill bit body incorporating teachings of the present disclosure. U.S. Pat. No. 5,373,907 entitled "Method And Apparatus For Manufacturing And Inspecting The Quality Of A Matrix Body Drill Bit" which is incorporated herein in its entirety, shows additional details concerning mold assemblies and conventional matrix bit bodies.

In an embodiment, mold assembly 100 may have a bottom and at least one side; a core centrally disposed within the mold; and a filter disposed above the bottom of the mold and within a space formed between the at least one side of the mold and the core. In an embodiment, mold assembly 100 may comprise a single component (not shown). In such embodiments, at least a portion of the mold may be broken upon completion of the infiltration process to remove the drill bit. In some embodiments, mold assembly 100 may include several components such as mold base 102, gauge ring or connector ring 110 and funnel 120. Mold base 102, gauge ring 110 and funnel 120 may be formed from graphite, consolidated sand, or other suitable materials. Various techniques may be used including, but not limited to, machining a graphite blank to produce mold base 102 with cavity 104 having a negative profile or a reverse profile of desired exterior features for a resulting fixed cutter drill bit. For example cavity 104 may have a negative profile which corresponds with the exterior profile or configuration of blades 52 (illustrated in FIG. 14) and junk slots or fluid flow passageways formed therebetween. The formation of mold assembly 100 in several components may allow for the reuse of at least one of the components to form multiple drill bits. For example, funnel 120 may be removed after the infiltration process and reused in a subsequent infiltration process.

Figure 9A:
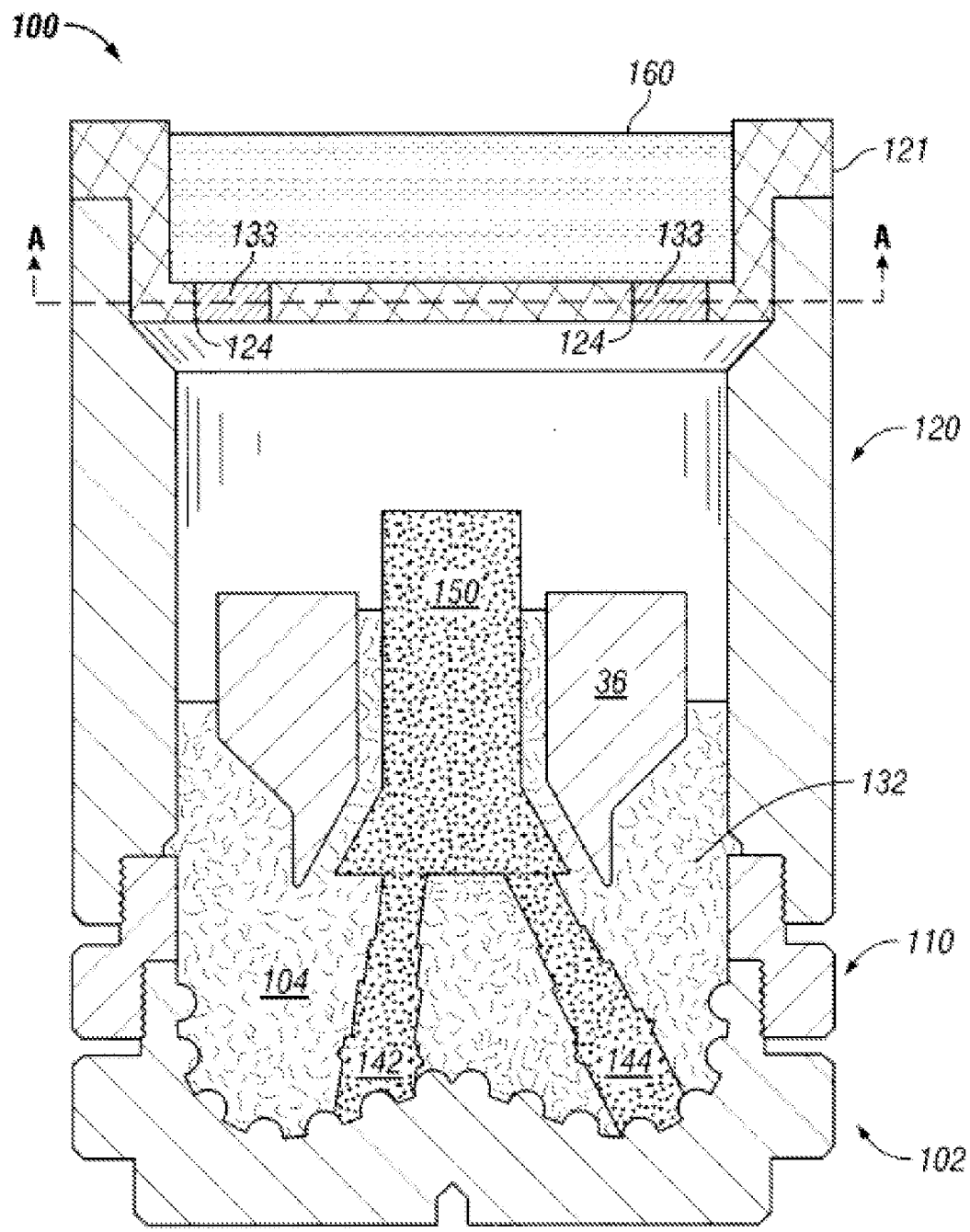
FIG. 9A is yet another schematic drawing in section with portions broken away showing one example of a mold assembly satisfactory for forming a matrix drill bit in accordance with the teachings of the present disclosure.
Figure 9B:
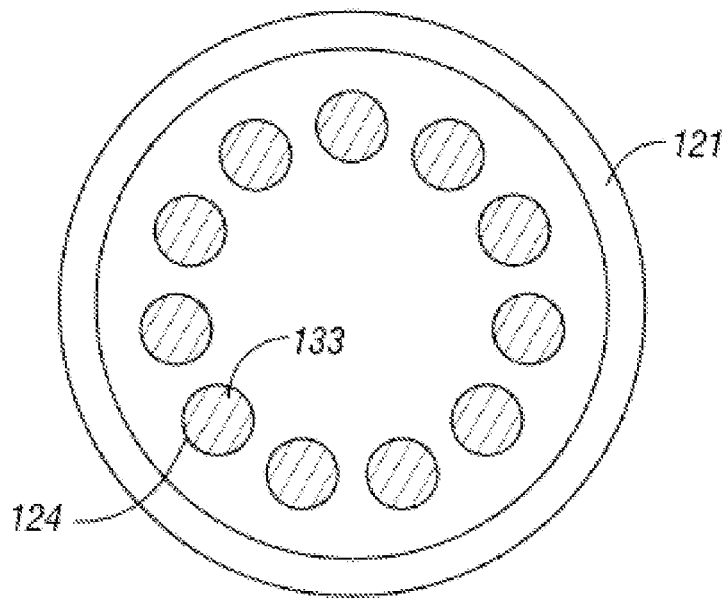
FIG. 9B is a cross-sectional plan view taken along line A-A of FIG. 9A of the layout of one example of a binder bowl satisfactory for use in forming a matrix drill bit in accordance with the teachings of the present disclosure.
Figure 9C:
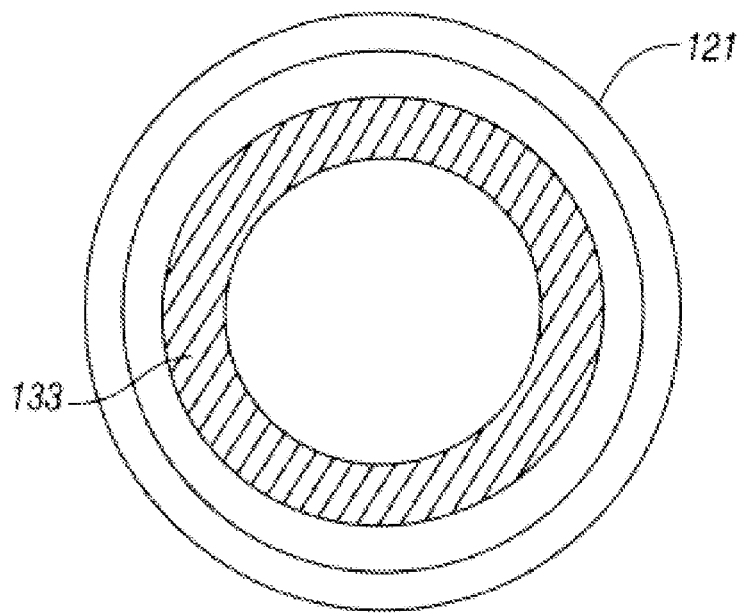
FIG. 9C is a cross-sectional plan view taken along line A-A of FIG. 9A of the layout of another example of a binder bowl satisfactory for use in forming a matrix drill bit in accordance with the teachings of the present disclosure.

In some embodiments as shown in FIG. 1, binder bowl 121 may be disposed on top of mold assembly 100. In general, binder bowl 121 may be used to hold the binder material, and optionally any flux, during the infiltration process. When used in the infiltration process, the binder material may melt to form a molten binder material that may flow through the binder bowl 121 into the matrix powder disposed in the mold below. Binder bowl 121 may be formed of a material similar to that used to form the mold assembly 100, for example using graphite, consolidated sand, or the like. Binder bowl 121 may be shaped so that it is disposed within the upper portion of mold assembly 100. For example, binder bowl 121 may be disposed on top of funnel 120. Binder bowl 121 may comprise one or more openings formed in the bottom of the binder bowl 121 of an appropriate size and shape so that any molten binder material within the binder bowl can flow through openings 124 into mold assembly 100 below. Openings 124 may be of any size or shape so long as binder bowl 121 maintains structural integrity when a binder material is placed on top of or within the binder bowl 121 and used in an infiltration process. In some embodiments as shown in FIGS. 9A-9C, openings 124 may be disposed in a ring about the outer edge of binder bowl 121 such that any molten binder material passing through openings 124 may pass between metal blank 36 and the inner surface of mold assembly 100 and/or between metal blank 36 and the outer wall of core 150. In some embodiments, a filter may be integrated within the body of binder bowl 121 or otherwise support a filter for filtering the binder material, as described in more detail below.

Figure 2:
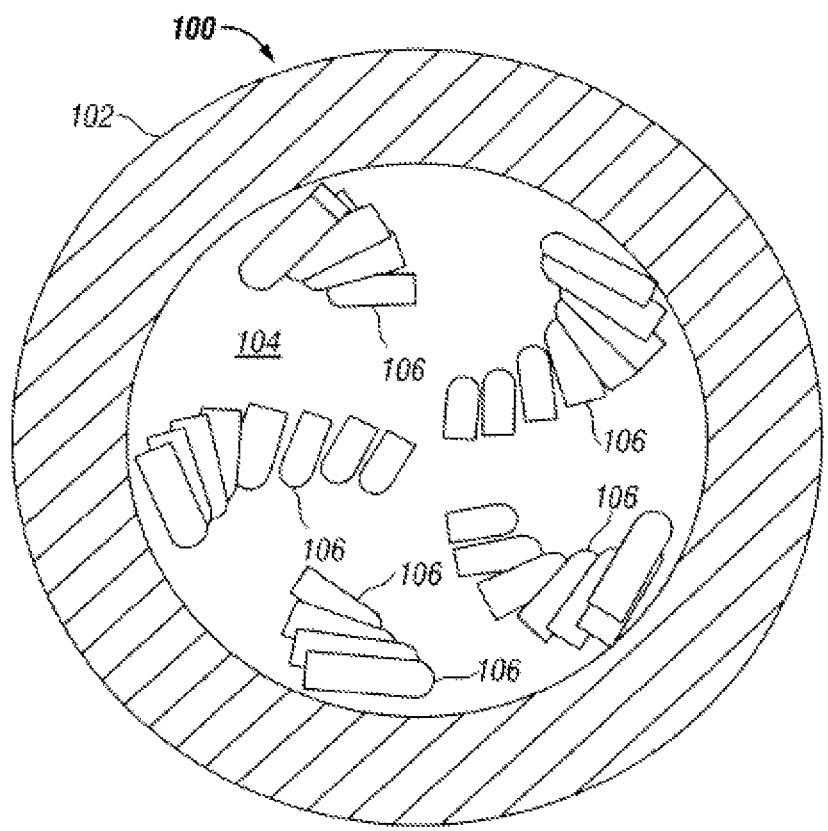
FIG. 2 is a schematic drawing in plan showing interior portions of one example of a mold satisfactory for use in forming a matrix drill bit in accordance with the teachings of the present disclosure.
Figure 3:
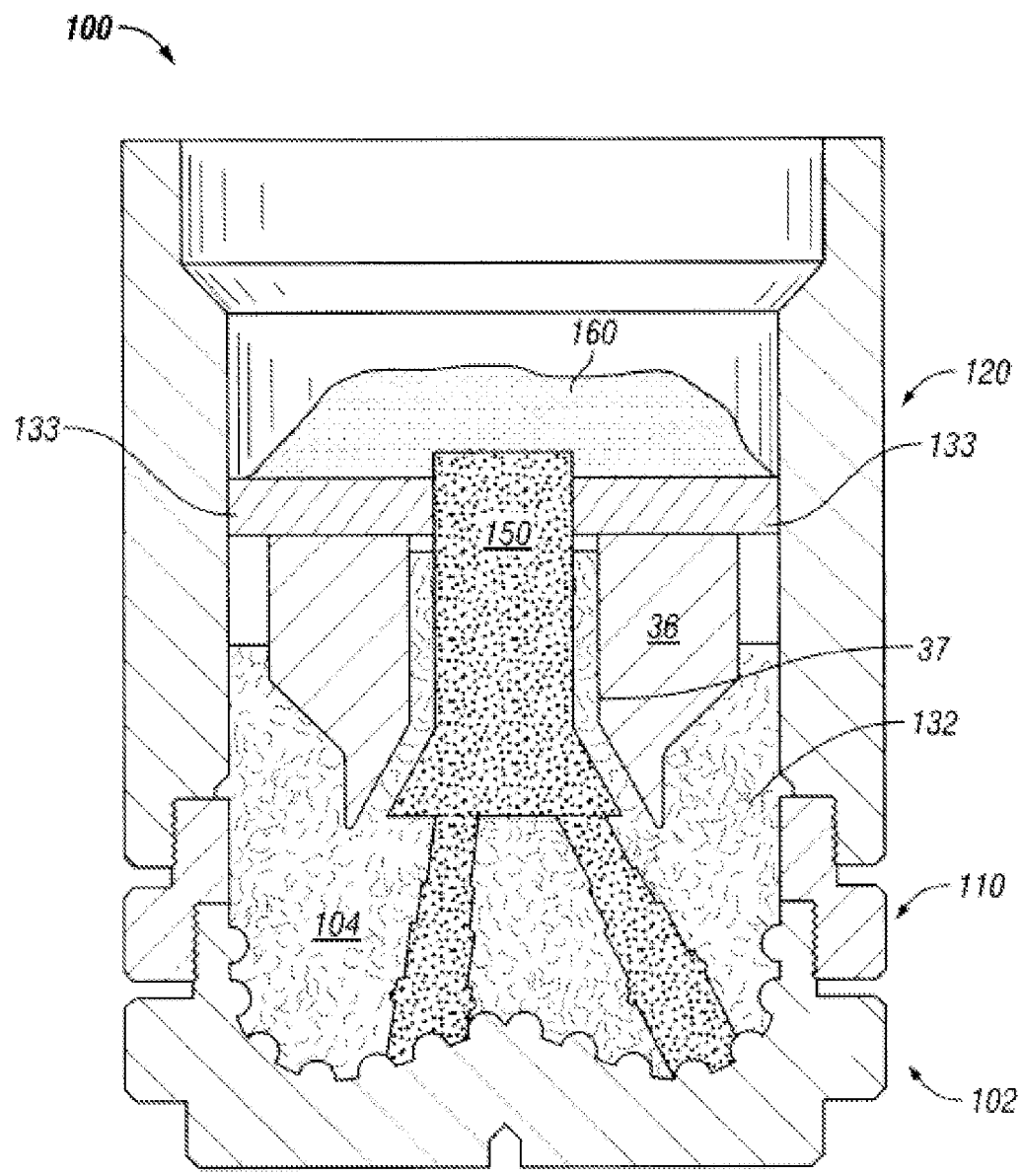
FIG. 3 is another schematic drawing in section with portions broken away showing one example of a mold assembly satisfactory for forming a matrix drill bit in accordance with the teachings of the present disclosure.
Figure 14:
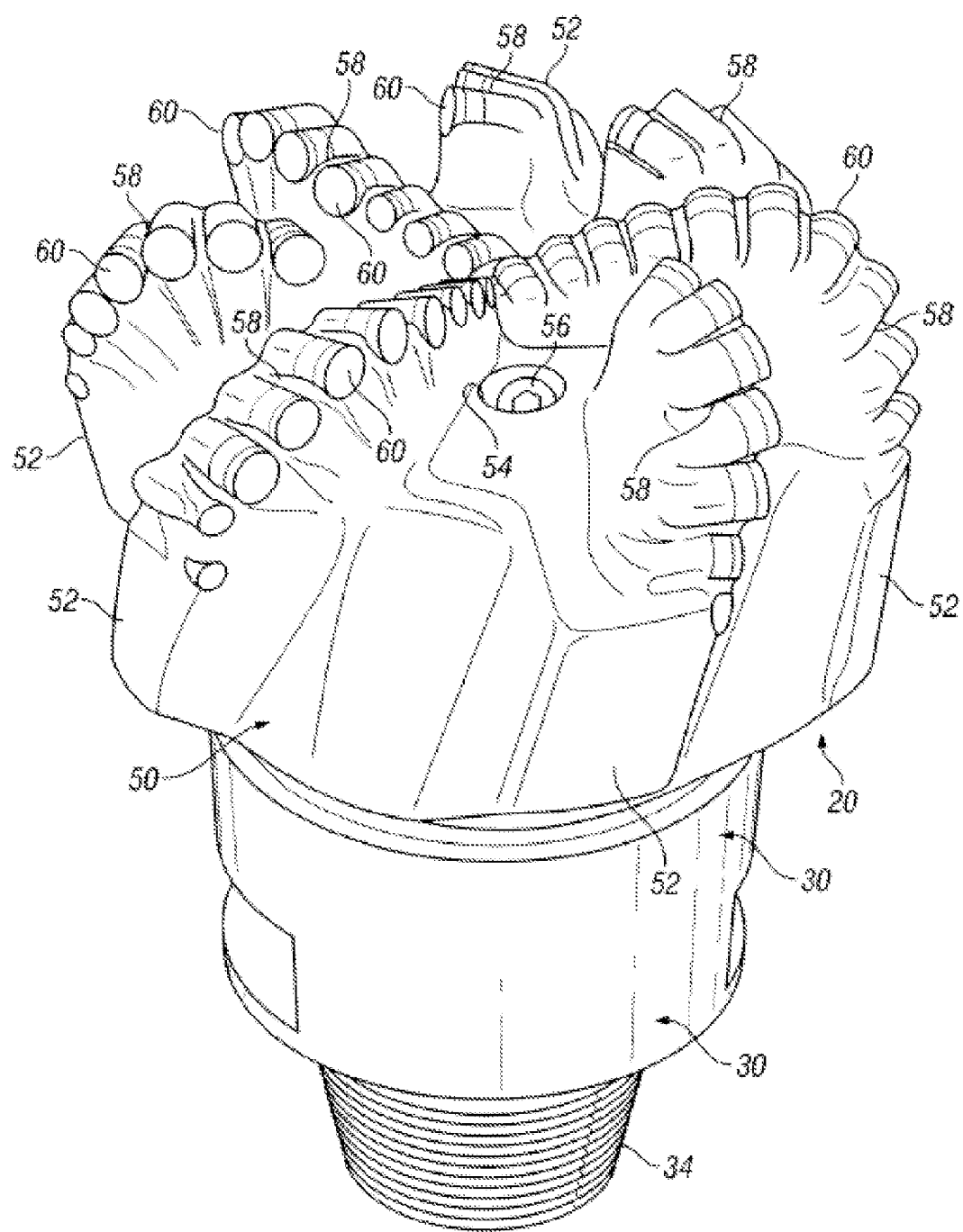
FIG. 14 is a schematic drawing showing an isometric view of a matrix drill bit having a matrix drill bit body formed in accordance with the teachings of the present disclosure.
Figure 15A:
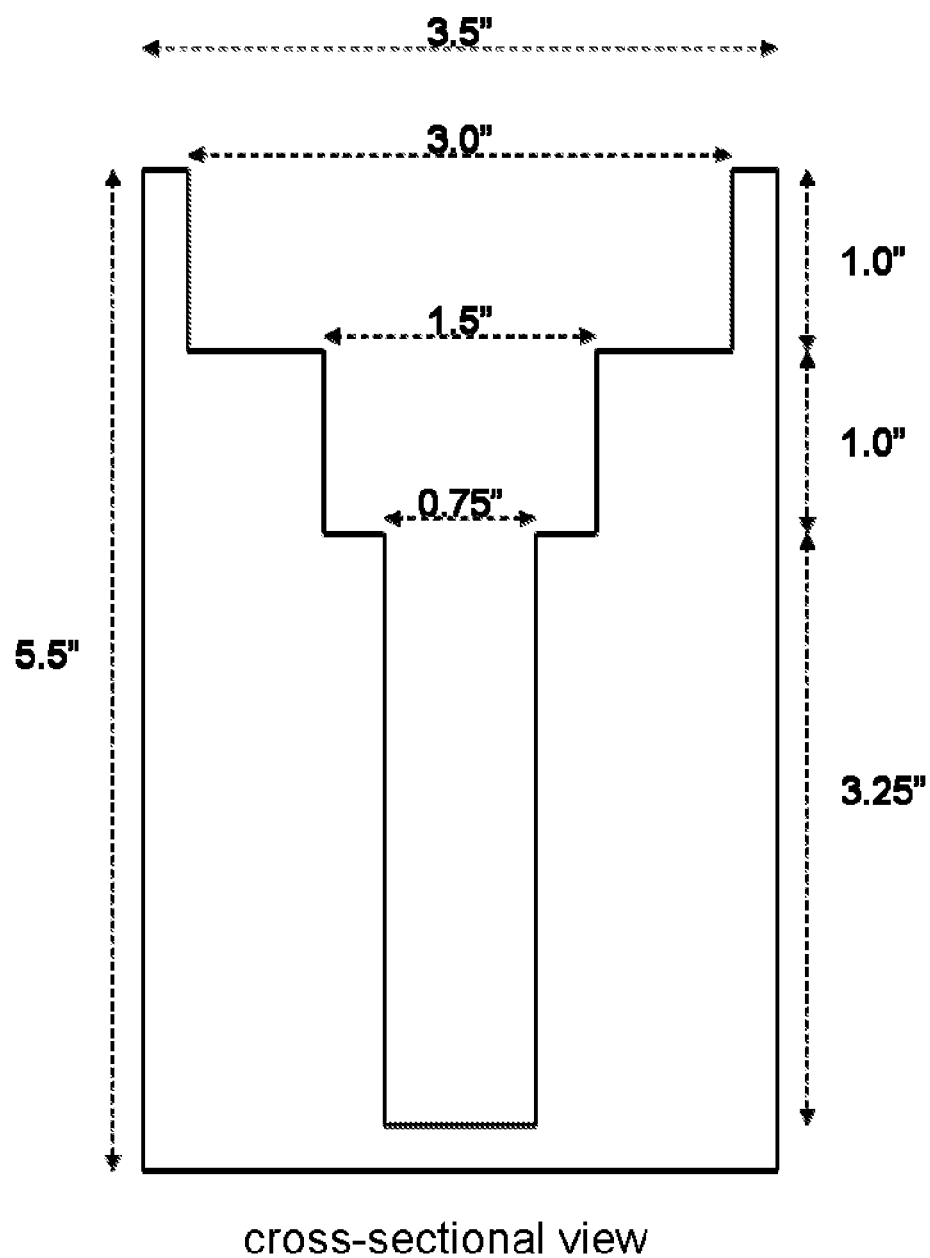
FIGS. 15A-B are schematic drawings in cross-section and top view showing a mold assembly satisfactory for forming a test pin in accordance with the teachings of the present disclosure.
Figure 15B:
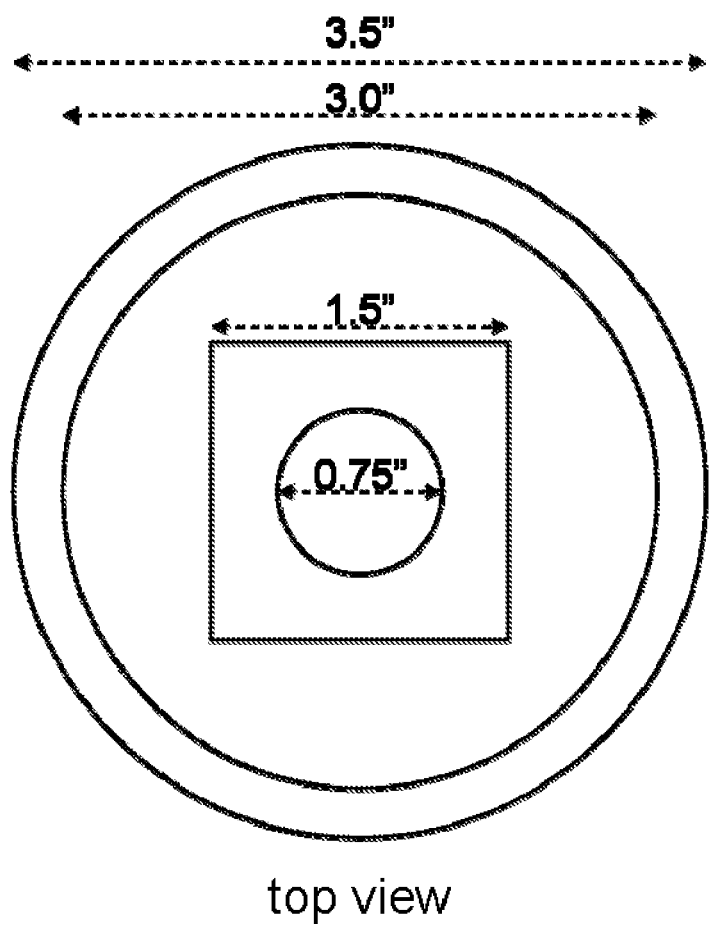
Figure 15C:
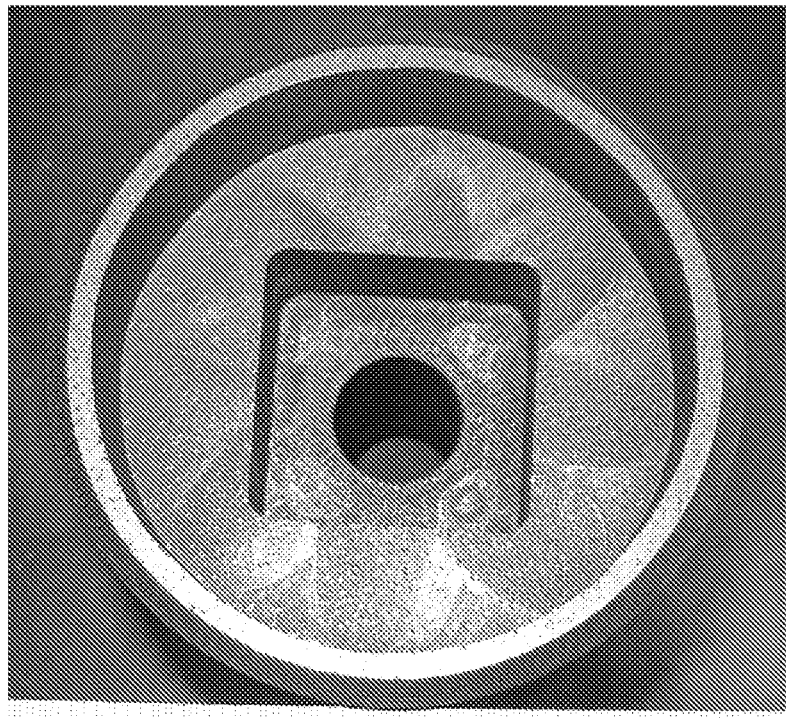
FIGS. 15C-D are top view pictures showing a mold assembly satisfactory for forming a test pin in accordance with the teachings of the present disclosure.
Figure 15D:
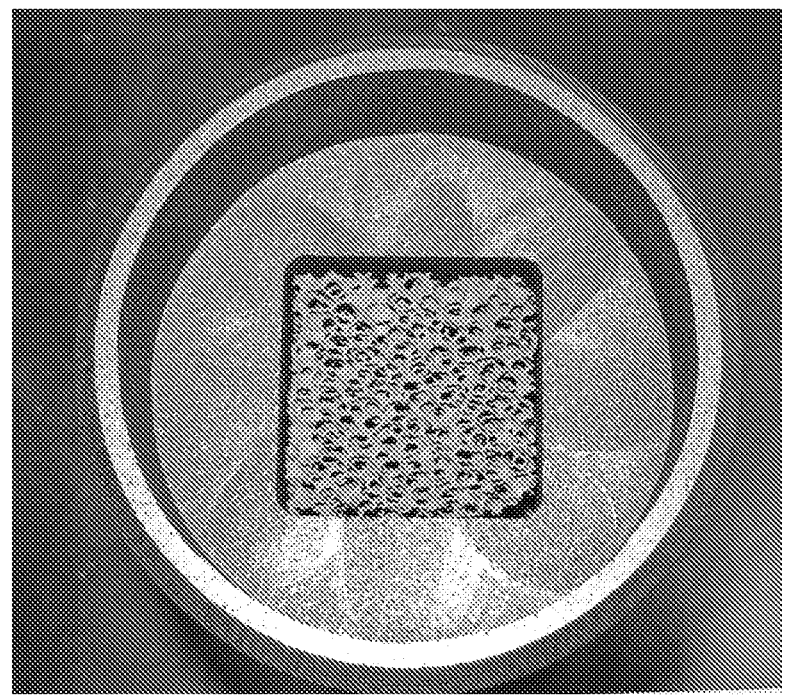

As shown in FIG. 2, a plurality of mold inserts 106 may be placed within cavity 104 to form respective pockets 58 in the blades 52 (blades 52 illustrated in FIG. 14). The location of mold inserts 106 in cavity 104 corresponds with desired locations for installing cutting elements 60 in associated blades 52. Mold inserts 106 may be formed from various types of material such as, but not limited to, consolidated sand and graphite. Various techniques such as brazing may be satisfactorily used to install cutting elements 60 in respective pockets 58 upon removal of the completed matrix drill bit from the mold.

Various types of temporary displacement materials may be satisfactorily installed within cavity 104, depending upon the desired configuration of a resulting matrix drill bit. Additional mold inserts (not expressly shown) formed from various materials such as consolidated sand and/or graphite may be disposed within cavity 104. Various resins may be satisfactorily used to form consolidated sand. Such mold inserts may have configurations corresponding with desired exterior features of matrix drill bit body 50 (illustrated in FIG. 14) such as fluid flow passageways formed between adjacent blades 52.

As shown in FIG. 1, before infiltration, displacement materials such as consolidated sand may be installed within mold assembly 100 at desired locations. Such displacement materials are shown at core 150 and legs 142 and 144 extending therefrom. Once the metal solidifies after infiltration, the displacement materials can be removed, leaving voids in the resulting drill bit where the displacement materials were formerly located. Such displacement materials may have various configurations. The orientation and configuration of legs 142 and 144 may be selected to correspond with desired locations and configurations of associated fluid flow passageways or voids to respective nozzle outlets 54 (illustrated in FIG. 14). The fluid flow passageways may receive threaded receptacles (not expressly shown) for holding respective nozzles therein.

A relatively large, generally cylindrically shaped core 150, which may be made from consolidated sand, may be placed on legs 142 and 144. Core 150 and legs 142 and 144 may be sometimes described as having the shape of a "crow's foot." Core 150 may also be referred to as a "stalk." The number of legs extending from core 150 will depend upon the desired number of nozzle openings in a resulting composite bit body. Legs 142 and 144 and core 150 may also be formed from graphite, consolidated sand, or other suitable material.

A generally hollow, cylindrical metal blank 36 may be placed within mold assembly 100. Metal blank 36 preferably includes inside diameter 37 which is larger than the outside diameter of core 150. Various fixtures (not expressly shown) may be used to position metal blank 36 within mold assembly 100. After desired displacement materials, including core 150 and legs 142 and 144, have been installed within mold assembly 100, a matrix powder 132 as described in more detail below, may be placed within mold assembly 100.

In an embodiment, a filter may be used to remove at least a portion of any inclusions to produce a final matrix drill bit with fewer inclusions and/or reduce the amount of flux required during the infiltration process. Without intending to be limited by theory, filters used in an infiltration process may function through a variety of mechanisms. The primary mechanisms may include sieving, cake filtration, and depth filtration. Sieving refers to the blocking of particles larger than the filter's openings at or near the inlet of the flow. Cake filtration refers to the build-up of inclusions on the filter's face, which further aids filtering of inclusions during subsequent molten metal flow. In an embodiment, cake filtration can be used to remove particles larger than about 30 microns.

Depth filtration refers to the filtering mode in which inclusions are physically attracted or bonded to the surface of the filter itself, for example through a physically attractive force including, but not limited to, gravity, friction, physical entrapment, chemically attractive forces, Van der Waals forces, electrostatic attractive forces, or any other similar force. In an embodiment, depth filtration is capable of removing particles equal to or smaller than about 30 microns. Depth filtration may be present with filters providing tortuous flow paths for molten metal. The tortuousity provides an increasing probability for particle capture as the inclusions within the molten metal contact the filter surface due to transport phenomena such as inertia, sedimentation, particle interception, and diffusion and then attach to the filter surface through one of the attractive forces described above.

In some embodiments of the present invention, at least one filter may be disposed along a flow path. In some embodiments of the present invention, at least one filter may be disposed along a flow path and in contact with the drill bit mold assembly, a piece thereof, a piece disposed therein, or any combination thereof. In some embodiments of the present invention, at least one filter may be disposed along a flow path and an integral part of the drill bit mold assembly, a piece thereof, a piece disposed therein, or any combination thereof. In some embodiments, filters may be removable from the drill bit mold assembly, a piece thereof, a piece disposed therein, or any combination thereof.

Filters suitable for use in the present invention can include any filters capable of removing inclusions within the binder material during the infiltration of matrix drill bits, and that are capable of withstanding the infiltration conditions necessary to form a matrix drill bit, which can include, for example, temperature and exposure to molten binder material. Several filter types exist for use in the infiltration process including, but not limited to, strainer filters, cellular filters, screen filters, ceramic cloth filters, bed filters, bonded particle filters, ceramic foam filters, or any other suitable filters. Strainer filters can comprise a regular pattern of round openings or elongated slits to form a straining surface that may trap inclusions mainly through sieve filtration and cake filtration mechanisms, though some bed filtration can occur. Similarly, cellular filters comprise a regular structured array of various shapes that provide openings for molten metal flow. The regular pattern of the cellular filters may have an increased flow rate, reduced turbulence of the molten metal through the filter, and reduced filter erosion as compared to strainer filters. Screen filters may comprise one or more mesh screens with an optional mesh, felt, or cloth disposed in front of and/or between the mesh screens. Screen filters may provide moderate filtration, particularly of larger particles and inclusions exceeding about 100 microns in diameter. Ceramic cloth filters can comprise any type of fibrous material formed from a ceramic or mineral material. Suitable ceramic cloths are commercially available and can be obtained, for example, as INSWOOL®, available from A.P. Green Industries, Inc. of Pennsylvania. Bed filters generally refer to a loose bed of particulate filter material through which a molten metal flows. Bed filters generally filter molten metal through a bed filtration mechanism and may provide a high efficiency of fine particulate filtration. Bonded particle filters generally comprise particles (e.g., refractory grain such as $Al_2O_3$, SiC, etc.) bonded together to form a rigid filter structure. Bonded particle filters may have a porosity ranging from about 25% to about 50%. Ceramic foam filters are produced by slurry coating a reticulated polyurethane cellular foam, followed by drying and firing to burn out the precursor foam. Ceramic foam filters may have a range of porosities, for example from about 50% to about 85% porous, and can include a pore size distribution suitable to capture a range of inclusion sizes. Suitable filters are commercially available from various companies such as ASHLAND INC. of Dublin, Ohio, and FOSECO METALLURGIC INC. of Cleveland, Ohio. Dual-structure or multilayered ceramic foam filters may also be employed to provide a desired level of filter efficiency. In some embodiments, multilayered filters comprising several filter types may be used to provide the desired filter efficiency.

In an embodiment, the choice of the filter type may be determined at least in part by the desired efficiency of the filter. As used herein, the term "filter efficiency" refers to the total weight of inclusions removed from the molten metal stream through one or more filters based on the inlet and outlet mass of the inclusions and expressed as a percentage of the inlet inclusion mass (i.e., the difference between the inlet mass of inclusions minus the outlet mass of inclusions, divided by the inlet mass of inclusions). The filter efficiency may depend on a variety of factors including, but not limited to, the nature of the molten metal itself (e.g., binder composition, viscosity based on temperature, etc.), the nature of the inclusions (e.g., size, shape, distribution), the molten metal flow rate (e.g., which may depend on the total molten metal head), the filter geometry (e.g., length, depth, total surface area), and the balance between the amount of sieving, cake filtration, and depth filtration. Without intending to be limited by theory, it is generally believed that lower molten metal flow rates generally result in greater filtration efficiency due to an increased probability that a given inclusion will be trapped within the filter through depth filtration. Similarly, a greater filter surface area can increase the probability of capturing an inclusion. In addition to filter efficiency, consideration of the filter design can take into account the mechanical properties of the filter. For example, the filter may need to be thicker than necessary for a desired efficiency in order to be able to mechanically support a desired amount of binder material during the infiltration process.

Consideration may be given to the permeability, porosity and/or pore size of the filter which can affect the pressure drop as molten binder material passes through the filter. As a general trend, the pressure drop through a filter increases with decreasing pore size and/or decreasing porosity. In general, a greater pressure drop can require more of a molten metal head that can result in more material being left above the filter and a corresponding loss of material during the infiltration process. In an embodiment, the permeability, pore size and/or porosity of the filter can be chosen to control the rate of infiltration of the molten binder material. Such an embodiment may be used to produce a desired molten binder flow rate into the matrix powder during the infiltration process. In an embodiment, the filter could be used to reduce the turbulence of molten binder falling from the binder bowl before it enters the matrix powder.

In an embodiment, a filter may be constructed of any material capable of withstanding the infiltration process conditions while maintaining the desired filtering efficiency. Suitable materials may include, but are not limited to, ceramics such as alumina, zirconia, cordierite, silica, mullite, silicon carbide, fiberglass, graphite, and any combinations thereof. Additional suitable materials may include, but are not limited to, suitable high temperature metals such as high temperature steel, cobalt, tungsten, and molybdenum, any alloys thereof, and any combinations thereof. One of ordinary skill in the art will recognize that some metals and/or ceramics may be unsuitable for use in the filters disclosed herein due to detrimental interactions with one or more binder materials used to infiltrate the matrix powder. One of ordinary skill in the art would be capable, with the benefit of this disclosure, of choosing an appropriate filter material and filter design for use with the matrix drill bit molds disclosed herein.

In an embodiment, a filter may be contacted with a flux prior to use in an infiltration process. Suitable flux materials may adsorb or absorb into a filter material during contact. As a result, the flux may be capable of binding with some inclusions (e.g., metal oxides) during the infiltration process while being contained in the filter material. Without intending to be limited by theory, such an embodiment may help remove some inclusions while preventing the free flow of flux that may contaminate the final matrix drill bit. In an embodiment, the flux may be contacted with the filter material using any technique known to one of ordinary skill in the art. One suitable process may include doping the filter material with an appropriate solution of a flux in a solvent followed by solvent extraction (e.g., drying if the solvent is an aqueous solution). Another suitable process may include contacting the filter material with a flux material and heating the filter material so that the flux melts and is allowed to adsorb or absorb into the filter material. Any excess flux may be separated from the filter material prior to cooling the filter material for use in the processes of the present invention. Yet another suitable process may include contacting the filter material with a flux carrying slurry and evaporating or heating the slurry to allow the flux to coat the filter.

In an embodiment, a filter may be incorporated into the matrix drill bit mold using any design in which the molten binder material passes through at least a portion of the filter prior to contacting and infiltrating the matrix powder. In general, the filter may be disposed within the mold in one or more flow paths of the molten binder material. In some embodiments, the filter may be disposed in and/or integrated with a binder bowl. In some embodiments, the filter may be disposed in a flow path of a molten binder material supplied from an external source. As used herein, the term "external source" refers to any source of a molten binder material other than a binder material placed in a binder bowl and/or within the mold itself and heated to form a molten binder material. Suitable examples of a molten binder material supplied from an external source are discussed in more detail below.

In some embodiments, the filter may be disposed within a flow path of a molten binder material within the mold. In an embodiment shown in FIG. 3, filter 133 may be disposed about the core 150 and rest on the metal blank 36. In this embodiment, the metal blank 36 supports filter 133 during the infiltration process, as described in more detail below. Filter 133 may be designed to contact funnel 120 and core 150 so that the molten binder material does not channel between filter 133 and funnel 120, or between filter 133 and core 150 during the infiltration process. Filter 133 may comprise any of the filter types or combination of filter types described herein that are capable of being supported on metal blank 36. For example, a bonded particle filter and/or ceramic foam filter may be used along with an optional particulate material on top in this embodiment.

Figure 4:
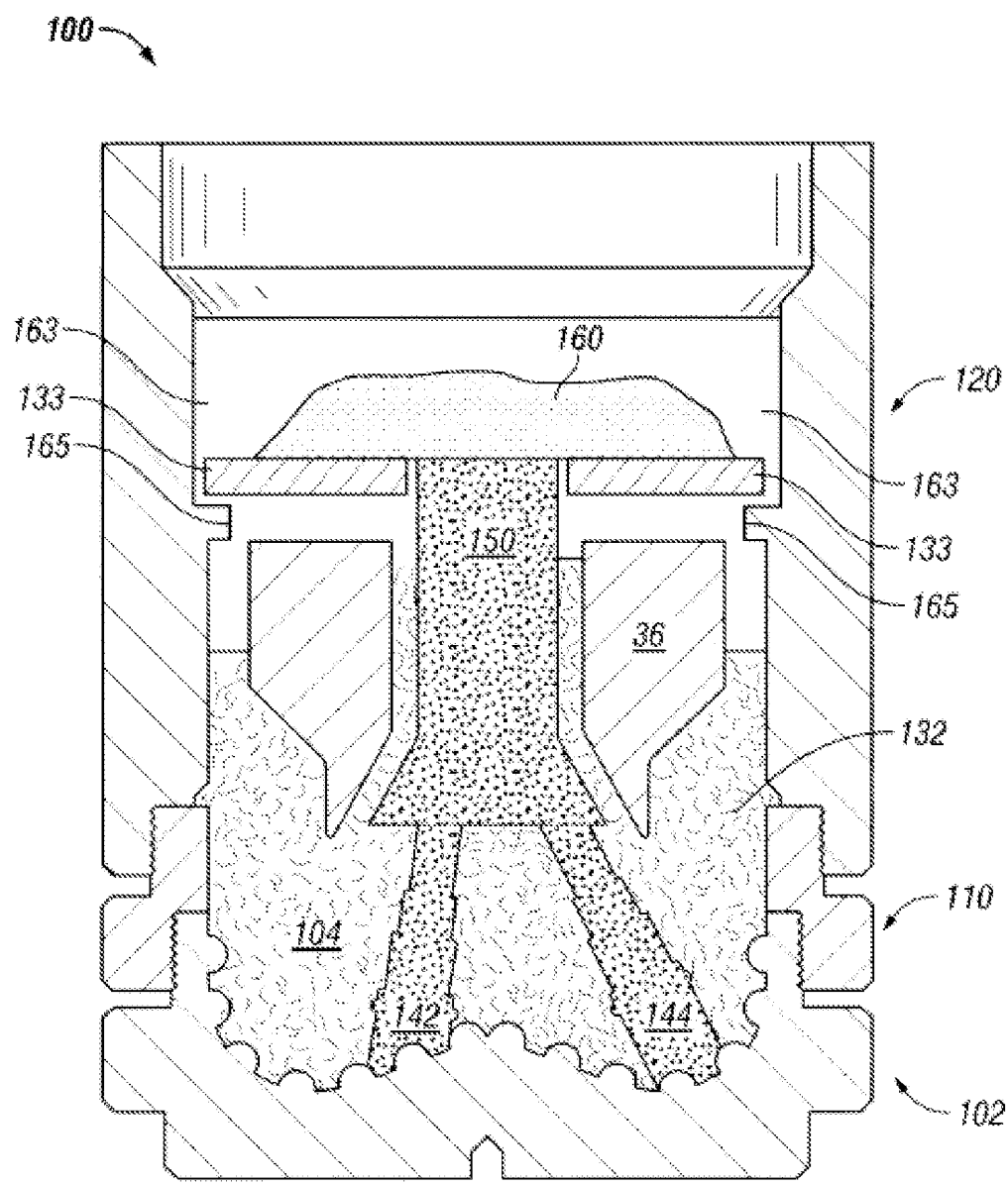
FIG. 4 is still another schematic drawing in section with portions broken away showing one example of a mold assembly satisfactory for forming a matrix drill bit in accordance with the teachings of the present disclosure.

In some embodiments, filter 133 may be disposed about core 150 and supported on a ledge disposed in or integrated with mold assembly 100. As shown in FIG. 4, ledge 165 can refer to any support structure disposed in mold assembly 100 that is capable of supporting filter 133 within mold assembly 100. In an embodiment, the ledge may be formed by the lower portion of cutout 163 in funnel 120. In some embodiments, ledge 165 can comprise a support structure disposed inside the funnel with or without additional cutout 163. In some embodiments, funnel 120 can comprise a horizontal ledge. In some embodiments, the ledge may be angled towards the interior of mold assembly 100 so that upon placement of filter 133 in mold assembly 100, a sealing engagement is achieved between the edge of filter 133 and funnel 120. Such an embodiment may help prevent any channeling of molten binder material between the edge of filter 133 and the inner edge of funnel 120. Filter 133 may comprise any of the filter types or combination of filter types described herein that are capable of being supported on ledge 165. For example, a bonded particle filter and/or ceramic foam filter may be used along with an optional particulate material disposed on top.

Figure 5:
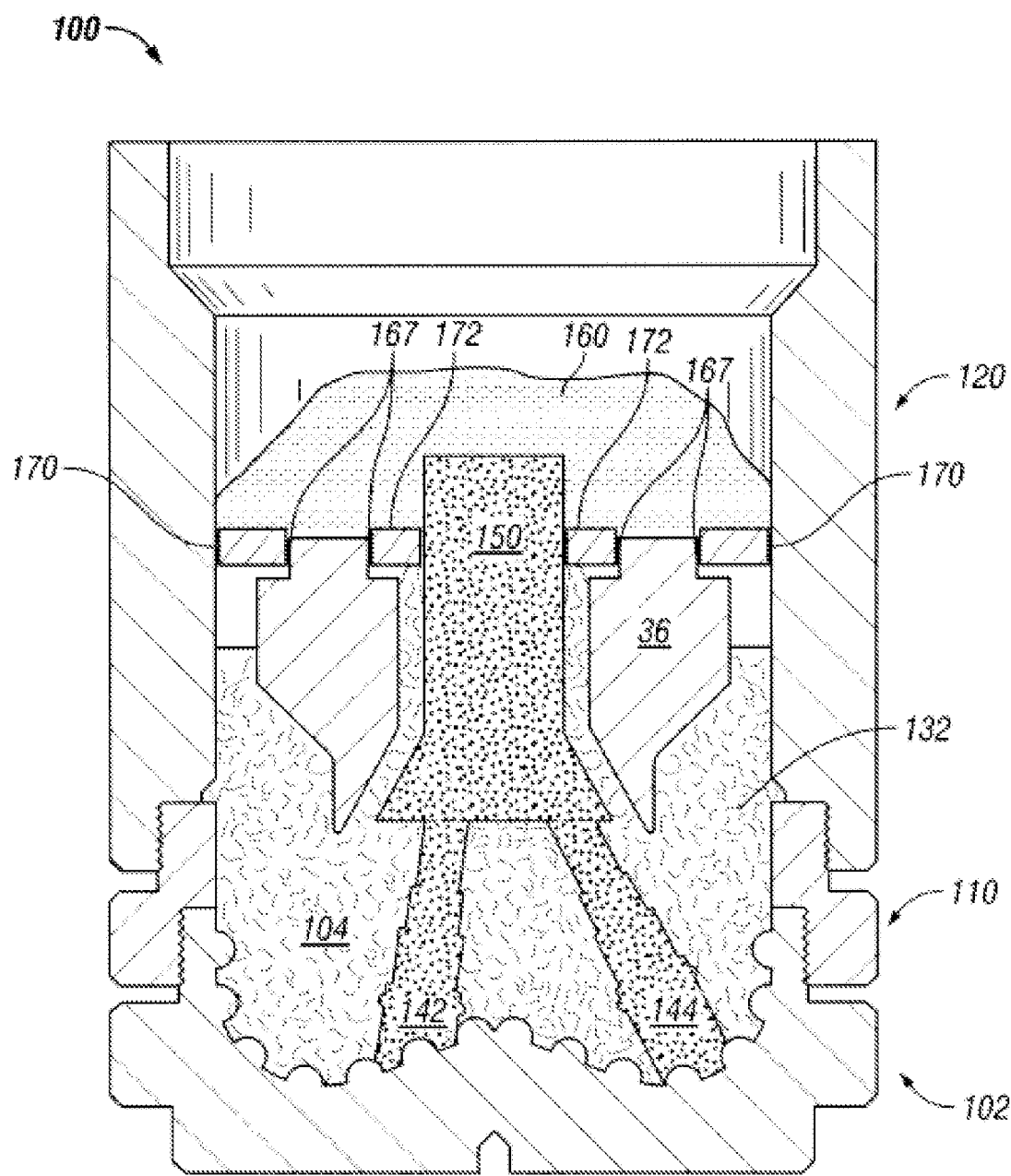
FIG. 5 is yet another schematic drawing in section with portions broken away showing one example of a mold assembly satisfactory for forming a matrix drill bit in accordance with the teachings of the present disclosure.

In some embodiments as shown in FIG. 5, one or more filters may be disposed within mold assembly 100 about metal blank 36. The filters 170, 172 may take the form of concentric rings disposed within mold assembly 100, though other shapes are possible if the mold assembly shape varies. Metal blank 36 may have one or more ledges 167 disposed therein of a suitable size and shape to support the one or more filters. In an embodiment, filter 170 may be supported by ledge 167 in the outer circumference of metal blank 36. Ledge 167 can comprise any support structure suitable for holding filter 170 during the infiltration process. In an embodiment, the lower portion of ledge 167 may have a horizontal surface. In some embodiments, the lower portion of ledge 167 may have a surface disposed at an angle. In some embodiments, the ledge may be angled so that filter 170 disposed between metal blank 36 and funnel 120 has a sealing engagement with metal blank 36 and funnel 120 to help prevent channeling of molten binder material between filter 170 and metal blank 36 and/or funnel 120. In some embodiments, an additional ledge and filter can be disposed between metal blank 36 and core 150. Ledge 167 may be disposed on the interior circumference of metal blank 36 to support filter 172. Ledge 167 disposed between metal blank 36 and core 150 may be similar to or distinct from ledge 167 disposed between metal blank 36 and funnel 120. In an embodiment, filter 172 can be used to filter any molten binder material that passes between metal blank 36 and core 150. Filters 170, 172 may comprise any of the filter types or combination of filter types described herein that are capable of being supported on ledge 167. For example, a bonded particle filter and/or ceramic foam filter may be used along with an optional particulate material disposed on top.

Figure 6:
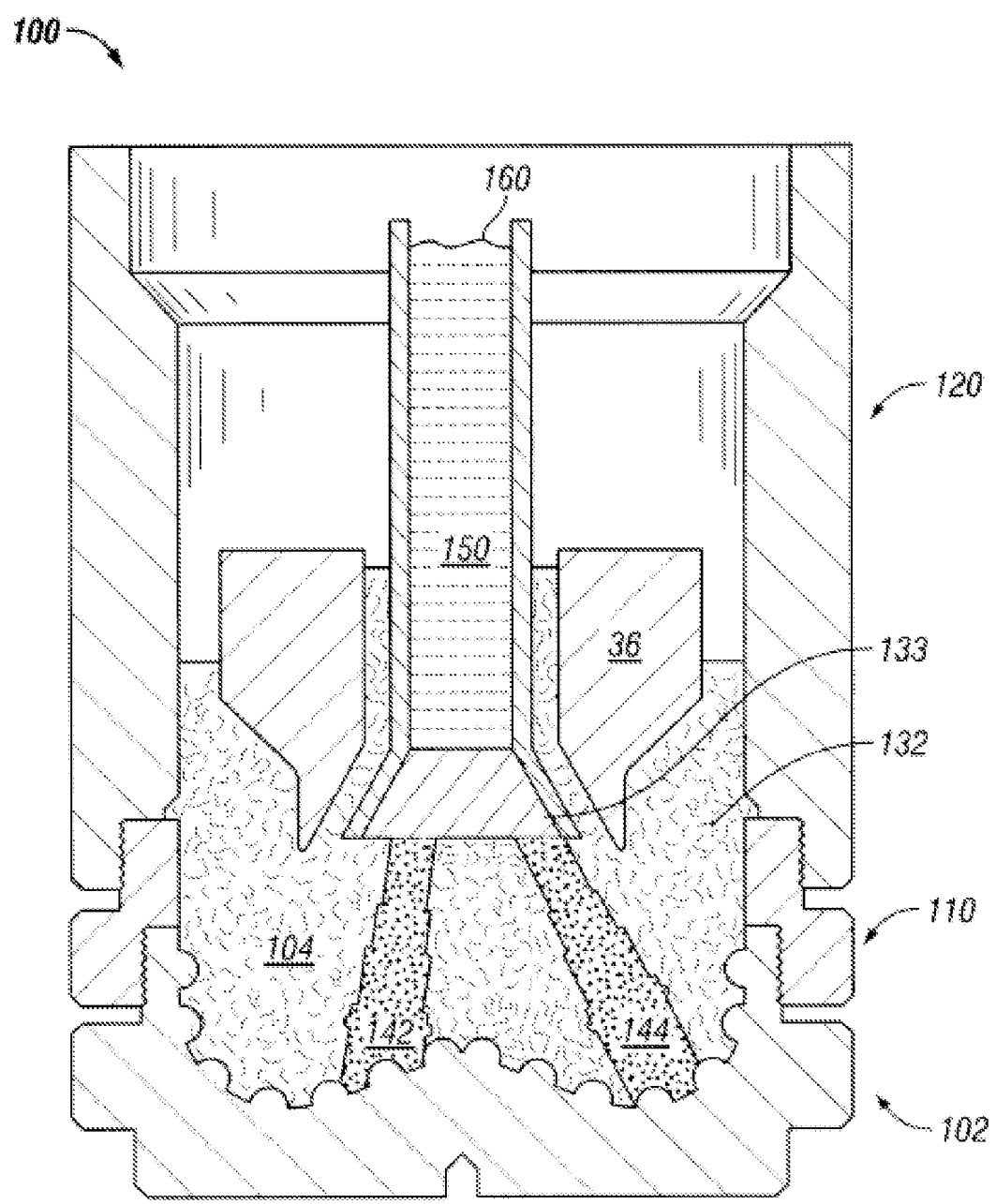
FIG. 6 is another schematic drawing in section with portions broken away showing one example of a mold assembly satisfactory for forming a matrix drill bit in accordance with the teachings of the present disclosure.

In an embodiment as shown in FIG. 6, a filter may be disposed within and/or be integrated with core 150 within mold assembly 100. In this embodiment, core 150 may have a hollow or carved out center suitable for holding binder material 160 and/or receiving a molten binder material during the infiltration process. Filter 133 may be disposed within the lower portion of core 150 and may be sealingly engaged with the interior of core 150. As a result, any molten binder material formed within the core and/or flowing through the core can pass through filter 133 prior to contacting and infiltrating matrix powder 132. In some embodiments, filter 133 may be disposed in core 150, and a binder bowl (not shown) may be used to funnel molten binder material into the center of core 150 such that the molten binder material passes through filter 133 prior to contacting and infiltrating matrix powder 132. Filter 133 may comprise any of the filter types or combination of filter types described herein that are capable of being disposed in or integrated with core 150.

Figure 7:
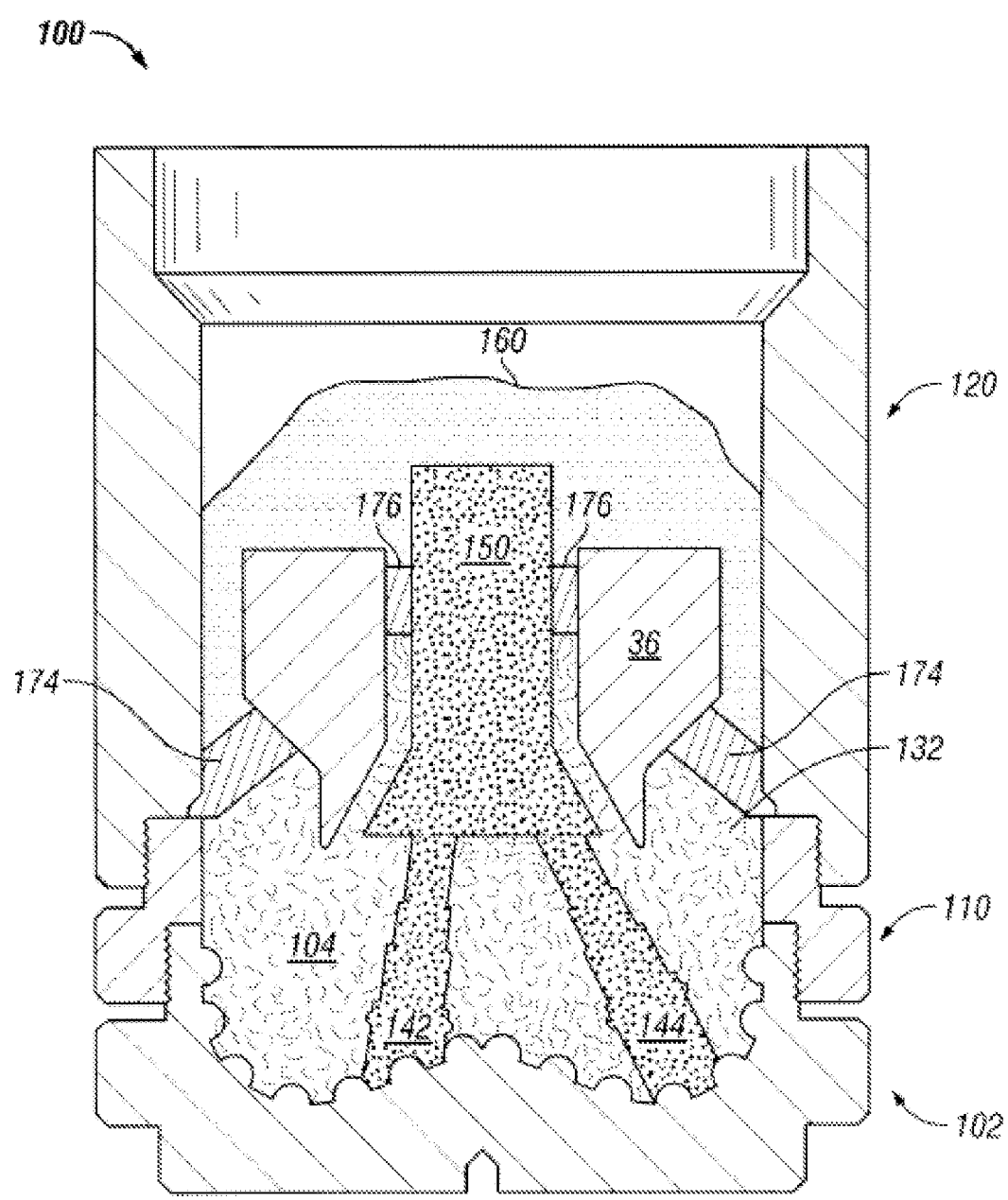
FIG. 7 is still another schematic drawing in section with portions broken away showing one example of a mold assembly satisfactory for forming a matrix drill bit in accordance with the teachings of the present disclosure.

In an embodiment as shown in FIG. 7, filter 174 may be disposed within mold assembly 100. In some embodiments, the matrix powder 132 is loaded in a mold such that the matrix powder may be subject to sloughing or other movements during the infiltration process. For example, matrix powder 132 may be loaded in mold assembly 100 such that the surface of the matrix powder 132 is in a non-horizontal orientation within mold assembly 100. In order to maintain a desired matrix powder form or shape in mold assembly 100, filter 174 may be formed into a corresponding shape and disposed in contact with matrix powder 132 to maintain its shape. In some embodiments, filter 174 may be disposed below metal blank 36 and in contact with funnel 120 such that matrix powder 132 is compressed and held in place by filter 174. In an embodiment, filter 176 may be disposed between metal blank 36 and core 150 to ensure that any molten binder that passes between metal blank 36 and core 150 passes through a filter prior to contacting and infiltrating matrix powder 132. Filters 174, 176 may comprise any of the filter types or combination of filter types described herein that are capable of being disposed within mold assembly 100. For example, a bonded particle filter and/or ceramic foam filter may be used along with an optional particulate material above or below the filter.

Figure 8:
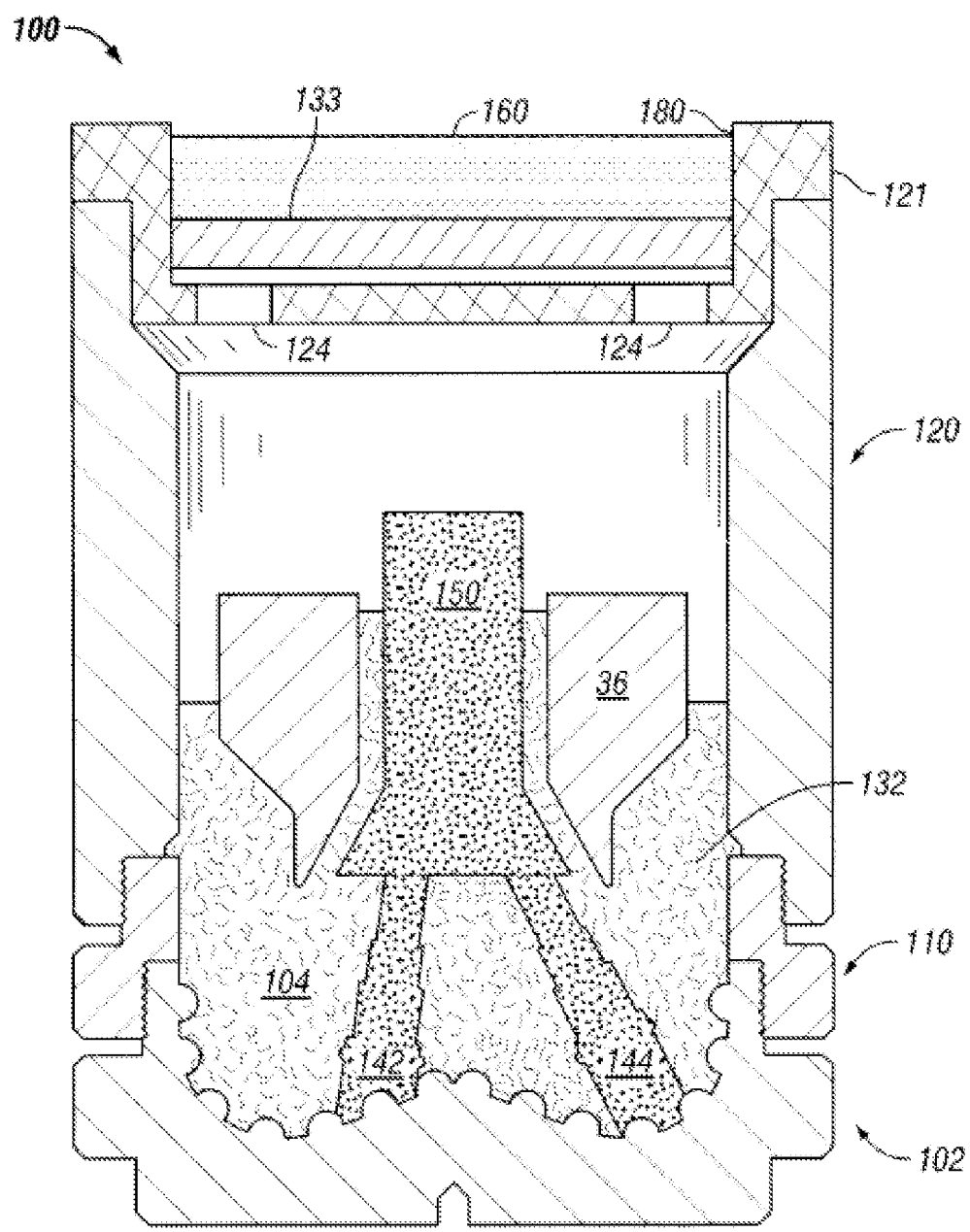
FIG. 8 is yet another schematic drawing in section with portions broken away showing one example of a mold assembly satisfactory for forming a matrix drill bit in accordance with the teachings of the present disclosure.

In some embodiments, the filter may be disposed in and/or integrated with a binder bowl 121. As shown in FIG. 8, filter 133 may be disposed within binder bowl 121. In an embodiment, filter 133 may comprise a disc or any other suitably shaped filter material placed within binder bowl 121 such that filter 133 contacts inner wall 180 of binder bowl 121. In this embodiment, any molten binder material placed within binder bowl 121 can pass through filter 133 prior to passing through openings 124 in binder bowl 121. Filter 133 may comprise any of the filter types or combination of filter types described herein that are capable of being supported over openings 124 in binder bowl 121. For example, a bonded particle filter and/or ceramic foam filter may be used along with an optional particulate material disposed on top.

In another embodiment shown in FIGS. 9A, 9B, and 9C, filter 133 is disposed within binder bowl 121 in either openings 124 or as an integral part with binder bowl 121. In an embodiment, filter 133 is a separate filter that is placed within openings 124 in binder bowl 121. Suitable filter placement may be accomplished through the use of an interference fit in which the filter 133 is pressed into the opening without significantly damaging filter 133 or binder bowl 121. In another embodiment, openings 124 in binder bowl 121 may comprise a tapered profile in the vertical direction so that openings 124 are slightly smaller at the bottom (i.e., the portion closer to the bottom of the mold) than at the top. Filter 133 may comprise a corresponding tapered profile so that the edge of filter 133 substantially contacts the edge of opening 124 along its entire length. Alternatively, filter 133 may have a non-tapered edge so that upon placement within tapered opening 124 of binder bowl 121, contact is provided at the lower edge of filter 133 to prevent channeling of the molten binder material around filter 133. In still another embodiment, openings 124 in binder bowl 121 may comprise a ledged profile such that at least a portion of the inner diameter of the opening is smaller at the bottom than at the top, thus forming a ledge upon which filter 133 may be placed. Filter 133 may have a corresponding shape and diameter to that of the upper portion of opening 124 in binder bowl 121. Upon placement of filter 133 in opening 124, the filter would rest on the ledge at the bottom of the opening in binder bowl 121. An exemplary top view of binder bowl 121 with filter 133 placed in openings 124 is shown in FIG. 9B.

In yet another embodiment, filter 133 may be incorporated into binder bowl 121. In some embodiments, filter 133 may be incorporated into binder bowl 121 during the manufacturing of the binder bowl 121 so that the filter material may be integrally formed in the binder bowl material. In an embodiment, filter 133 may be disposed within openings 124 of binder bowl 121 during manufacturing such that the final binder bowl is similar to a design in which filter 133 is disposed in openings 124 in binder bowl 121. For example, filter 133 may be disposed in a graphite binder bowl so that the graphite is formed around the edges of the filter and securely holds the filter in place. In another embodiment, a plurality of holes may be formed in binder bowl 121 to form a strainer filter and/or cellular filter that forms the opening 124 of binder bowl 121. For example, the holes of a strainer filter may be directly formed in a solid binder bowl blank. In an embodiment, filter 133 may be formed in any suitable shape or pattern in binder bowl 121. For example, the filter formed in the binder bowl from a binder bowl blank may be disposed in a pattern around the circumference of the binder bowl, or the filter can be formed as a pattern on the entire surface of the binder bowl. In an embodiment as shown in FIG. 9C, filter 133 may form a continuous band in binder bowl 121.

Figure 10:
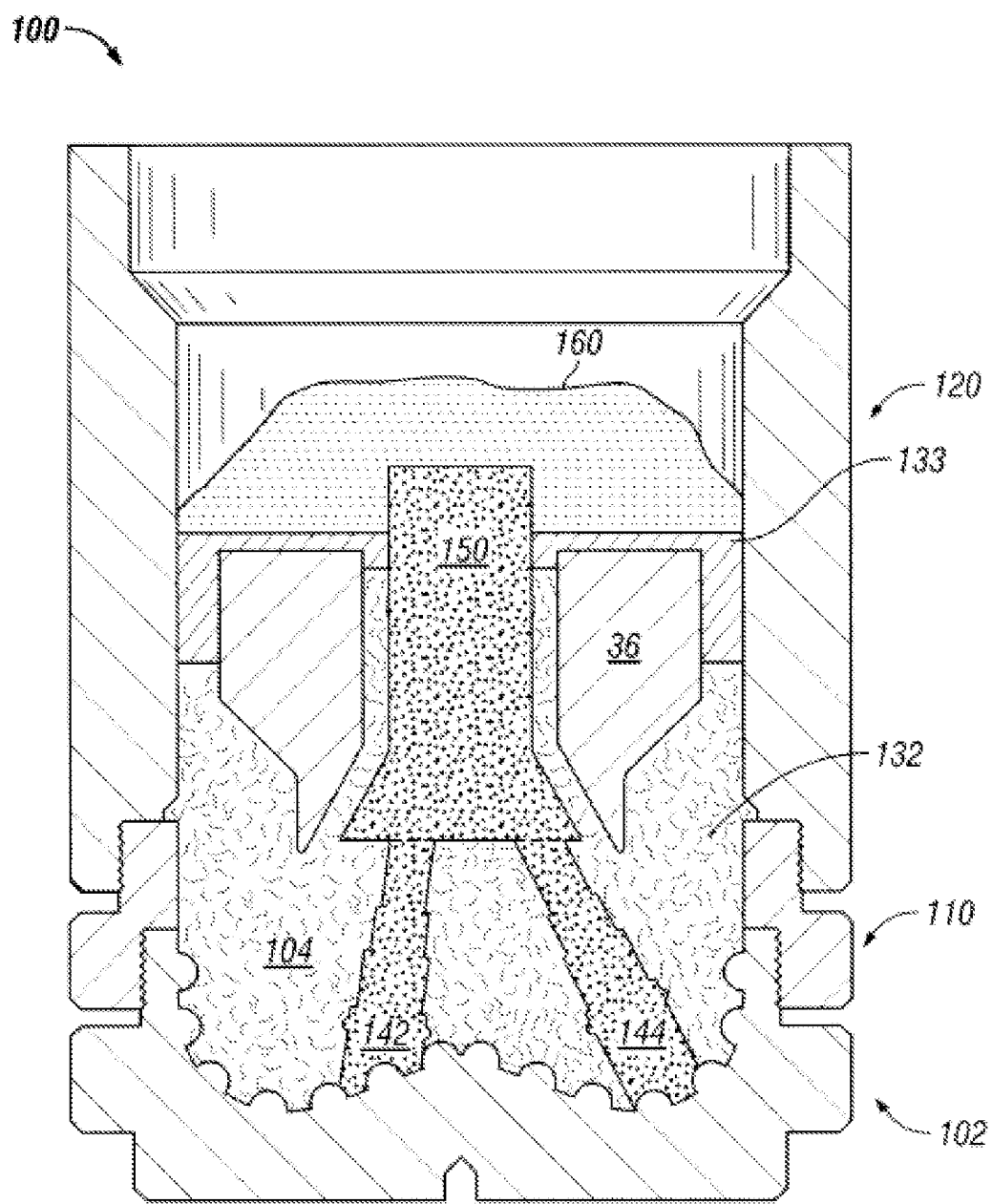
FIG. 10 is still another schematic drawing in section with portions broken away showing one example of a mold assembly satisfactory for forming a matrix drill bit in accordance with the teachings of the present disclosure.

In still another embodiment shown in FIG. 10, filter 133 may comprise a loose particulate material to form a bed filter. Filter 133 may be disposed on top of matrix powder 132 within mold assembly 100. While FIG. 10 illustrates filter 133 comprising particulate material disposed about metal blank 36 as well as core 150, more or less of the particulate material may be used to selectively form a bed filter in separate portions of the mold. For example, filter 133 may comprise particulate material disposed only between metal blank 36 and the side of funnel 120. In an alternative embodiment (not shown), a filter material comprising a particulate material may be disposed above and supported by a structured filter media (e.g., ceramic foam filter, bonded particle filter, etc.). The structured filter media may in turn be supported by metal blank 36 or some other structure within mold assembly 100. The particulate material may have a particle size distribution that is suitable to form a desired porosity and pore size distribution, which in turn can affect the pressure drop through the particulate material bed and filtration efficiency. In an embodiment, the particle size of the particulate material may have a lower limit based on the particle size of the matrix powder disposed in the matrix drill bit mold. Without intending to be limited by theory, it is believed that the particle size of the particulate material should be larger than the matrix powder particle size to prevent the particulate material from being entrained in the molten binder material and carried into the matrix powder during the infiltration process.

In some embodiments, the filter may be disposed in a flow path of a molten binder material supplied from an external source. In an embodiment shown in FIG. 11, filter 133 may be disposed in the side of mold assembly 100 (e.g., in the side of funnel 120) such that a flow path for molten binder material is provided between the mold assembly 100 and an outer mold 190. The filter may comprise discrete filter elements disposed in mold assembly 100, or the filter can comprise a ring of filter material forming a portion of the side wall of mold assembly 100. In this embodiment, mold assembly 100 may be disposed within the outer mold 190 that may provide the external source of molten binder material during the infiltration process. Outer mold 190 may be of a sufficient diameter to allow for binder material 160 to be placed between the inner wall of outer mold 190 and the outer wall of mold assembly 100. Outer mold 190 may be constructed of a material similar to mold assembly 100. Filter 133 can filter any molten binder material passing from the outer mold 190 through filter 133 and into mold assembly 100 during the infiltration process. Filter 133 may comprise any of the filter types or combination of filter types described herein that are capable of being disposed in and/or integrated with mold assembly 100, for example, in funnel 120.

Figure 12:
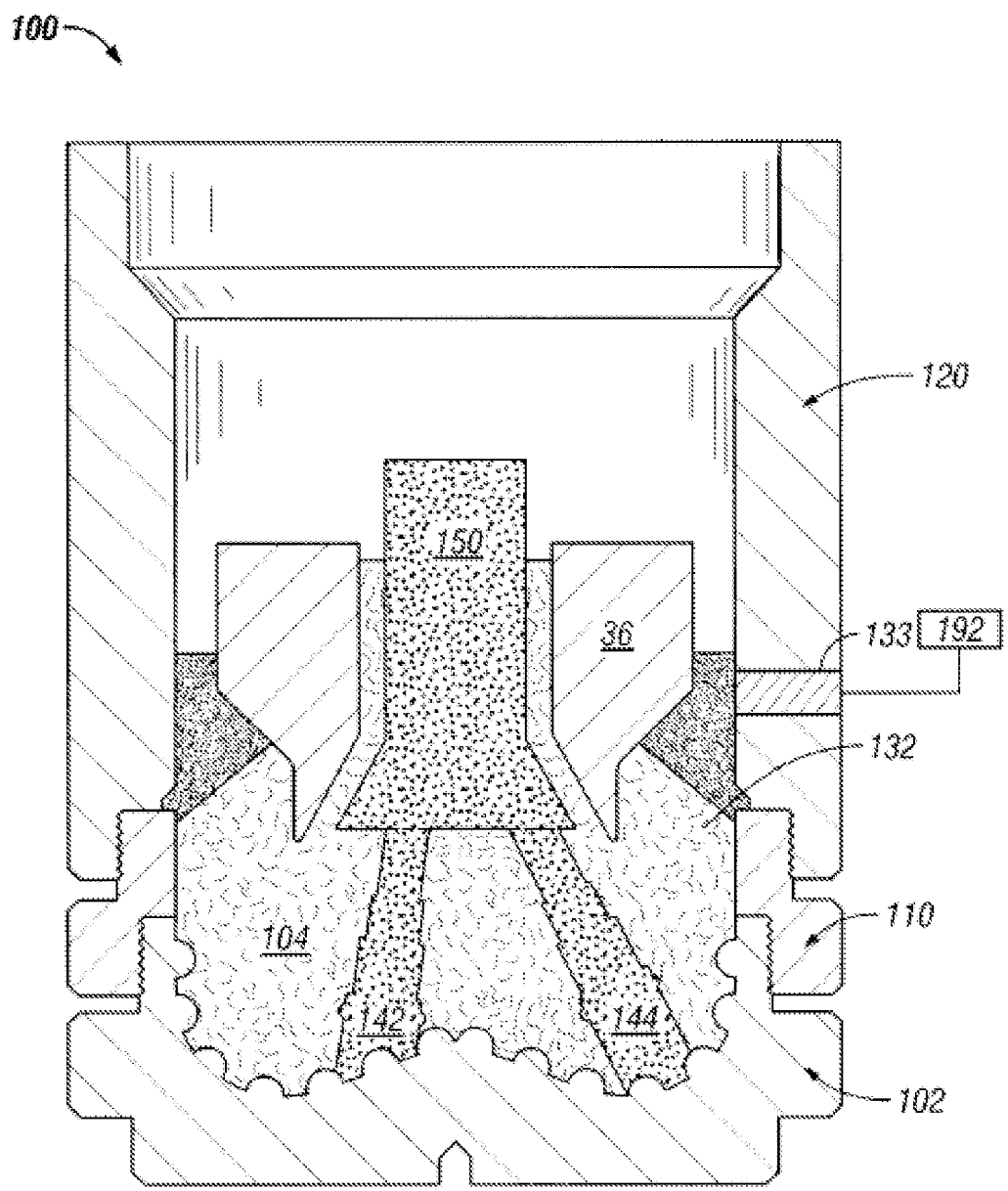
FIG. 12 is another schematic drawing in section with portions broken away showing one example of a mold assembly with a schematic representation of an external molten binder material source in accordance with the teachings of the present disclosure.

In still another embodiment, the filter may be disposed in a flow path of molten binder material supplied from an external source. As shown in FIG. 12, filter 133 may be disposed in the side of mold assembly 100 (e.g., in the side of funnel 120) such that a flow path for molten binder material is provided between the interior and the exterior of mold assembly 100. External molten binder material source 192 may be in fluid communication with the exterior surface of filter 133 disposed in mold assembly 100. Suitable external molten binder material sources may include, but are not limited to, separate containers within the same furnace and/or external furnaces containing molten binder material. For example, the external molten binder material source 192 may provide molten binder material formed in a separate furnace and transported in a ladle for transfer through filter 133 and into mold assembly 100. Filter 133 may comprise any of the filter types or combination of filter types described herein that are capable of being disposed in and/or integrated with mold assembly 100.

Mold assembly 100 may be used to form a matrix drill bit. In general, a matrix drill bit comprises a matrix powder infiltrated with a binder material in an infiltration process, as described in more detail below. The matrix powder is placed within the mold assembly around any mold inserts. The matrix powder generally lends desirable mechanical properties to a matrix drill bit such as a high resistance to abrasion, erosion and wear. The matrix powder can comprise particles of any erosion resistant materials which can be bonded (e.g., mechanically) with a binder to form a matrix drill bit. Suitable materials may include, but are not limited to, carbides, nitrides, natural and/or synthetic diamonds, and any combination thereof.

In an embodiment, a matrix powder may comprise tungsten carbide. Various types of tungsten carbide may be used with the present invention, including, but not limited to, stoichiometric tungsten carbide particles, cemented tungsten carbide particles, and/or cast tungsten carbide particles. The first type of tungsten carbide, stoichiometric tungsten carbide, may include macrocrystalline tungsten carbide and/or carburized tungsten carbide. The second type of tungsten carbide, cemented tungsten carbide, may include sintered spherical tungsten carbide and/or crushed cemented tungsten carbide. The third type of tungsten carbide, cast tungsten carbide, may include spherical cast tungsten carbide and/or crushed cast tungsten carbide. Additional materials useful as matrix powder or as part of a matrix powder blend include, but are not limited to, silicon nitride ($Si_3N_4$), silicon carbide (SiC), boron carbide ($B_4C$), cubic boron nitride (CBN), and any other materials known to be useful as matrix powders.

The various materials useful as a matrix powder may be selected so as to provide a matrix powder and final matrix drill bit that is tailored for a particular application. For example, the type, shape, and/or size of a particulate material used in the formation of a matrix drill bit may affect the material properties of the matrix drill bit, including, for example, fracture toughness, transverse rupture strength, and erosion resistance. In an embodiment, the matrix powder may comprise a single material or a blend of materials. In addition, two or more matrix powders may be combined as necessary to form the matrix powder with the characteristics described herein. In addition, two or more powders may be separately loaded into a mold to form a matrix drill bit with properties that can vary throughout the drill bit.

A binder material is used to infiltrate the matrix powder to form a solid composite material. In an embodiment, the infiltrated matrix powder may be formed during the infiltration process and can form a matrix drill bit. The terms "binder" or "binder material" may be used in this application to include copper, cobalt, nickel, iron, zinc, manganese, tin, any alloys of these elements, any combinations thereof, or any other material satisfactory for use in forming a matrix drill bit comprising a matrix powder as described above. Such binders generally provide the desired strength, ductility, toughness, and thermal conductivity for an associated matrix drill bit.

In an embodiment, the drill bit mold comprising a filter according to the present invention may be used to form at least a portion of a matrix drill bit. Matrix drill bits can be used to drill oil and gas wells, geothermal wells and water wells. As shown in FIG. 14, matrix drill bits are often formed with a matrix drill bit body 50 having cutting elements or inserts 60 disposed at select locations of exterior portions of the matrix drill bit body, which may correspond to the mold inserts 106 placed within cavity 104 (as shown in FIG. 2) to form pockets 58. Fluid flow passageways are typically formed in the matrix drill bit body 50 to allow communication of drilling fluids from associated surface drilling equipment through a drill string or drill pipe attached to the matrix drill bit body 50.

FIG. 14 is a schematic drawing showing one example of a matrix drill bit 20 that may be formed with a matrix drill bit mold in accordance with teachings of the present disclosure. For embodiments such as shown in FIG. 14, matrix drill bit 20 may include shank 30 with matrix drill bit body 50 securely attached thereto. Shank 30 may be described as having a generally hollow, cylindrical configuration defined in part by a fluid flow passageway therethrough. Various types of threaded connections, such as American Petroleum Institute (API) connection or threaded pin 34, may be formed on shank 30 opposite from matrix drill bit body 50.

In some embodiments, a generally cylindrical metal blank 36 (illustrated in FIGS. 1-13 may be attached to hollow, generally cylindrical shank 30 using various techniques. For example, an annular weld groove may be formed between adjacent portions of metal blank 36 and shank 30. The fluid flow passageway or longitudinal bore preferably extends through shank 30 and the blank. The blank and shank 30 may be formed from various steel alloys or any other metal alloy associated with manufacturing rotary drill bits.

A matrix drill bit may include a plurality of cutting elements, inserts, cutter pockets, cutter blades, cutting structures, junk slots, and/or fluid flow paths that may be formed on or attached to exterior portions of an associated bit body after the matrix bit is removed from the matrix drill bit mold. For an embodiment such as shown in FIG. 14, a plurality of cutter blades 52 may form on the exterior of matrix drill bit body 50. Cutter blades 52 may be spaced from each other on the exterior of matrix drill bit body 50 to form fluid flow paths or junk slots therebetween.

A plurality of nozzle outlets 54 may be formed in matrix drill bit body 50. Respective nozzle 56 may be disposed in each nozzle outlet 54. For some applications nozzle 56 may be described as an "interchangeable" nozzle. Various types of drilling fluid may be pumped from surface drilling equipment (not expressly shown) through a drill string (not expressly shown) attached with threaded connection 34 and the fluid flow passageways to exit from one or more nozzles. The cuttings, downhole debris, formation fluids and/or drilling fluid may return to the well surface through an annulus (not expressly shown) formed between exterior portions of the drill string and interior of an associated well bore (not expressly shown).

A plurality of pockets or recesses may be formed in blades 52 at selected locations. Respective cutting elements 60 may be securely mounted in each pocket to engage and remove adjacent portions of a downhole formation. Cutting elements 60 may scrape and gouge formation materials from the bottom and sides of a well bore during rotation of matrix drill bit 20 by an attached drill string. In some embodiments, various types of polycrystalline diamond compact (PDC) cutters may be satisfactorily used as cutting elements 60. A matrix drill bit having such PDC cutters may sometimes be referred to as a "PDC bit."

U.S. Pat. No. 6,296,069 entitled "Bladed Drill Bit with Centrally Distributed Diamond Cutters" and U.S. Pat. No. 6,302,224 entitled "Drag-Bit Drilling with Multi-Axial Tooth Inserts" show various examples of blades and/or cutting elements which may be used with a composite matrix bit body incorporating teachings of the present disclosure. It will be readily apparent to persons having ordinary skill in the art that a wide variety of fixed cutter drill bits, drag bits and other drill bits may be satisfactorily formed with a matrix drill bit body incorporating teachings of the present disclosure. The present disclosure is not limited to matrix drill bit 20 or any specific features as shown in FIG. 14.

A matrix drill bit may be formed using the matrix drill bits of the present invention that may have a functional gradient. In this embodiment, one or more portions of the matrix drill bit (e.g., an outer layer) may be formed using one type of matrix powder disclosed herein, while a different matrix powder composition is used to form the remaining portions of the matrix drill bit (e.g., the interior portions). As an example, a resulting matrix drill bit can be described as having a "functional gradient" since the outer portions may have improved erosion resistance while the inner portions may exhibit improved mechanical strength by having a different material composition. Methods of forming matrix drill bits with different functional zones is described in U.S. Pat. No. 7,398,840 entitled "Matrix Drill Bits and Method of Manufacture."

A tool comprising a matrix drill bit in whole or in part as formed in accordance with the teachings of the present invention may be used for other applications in a wide variety of industries and is not limited to downhole tools for the oil and gas industry.

The matrix drill bits of the present invention may be formed using any technique known in the art. An embodiment of a typical infiltration process may be described with reference to FIGS. 3 through 13. In an embodiment, a infiltration process for producing matrix drill bits may begin by forming mold assembly 100 in the shape of a desired component. In some embodiments, the mold assembly 100 may be formed as a single piece with interior features corresponding to the final matrix drill bit features. In some embodiments, mold assembly 100 may comprise two or more pieces. For an embodiment in which mold assembly 100 comprises a plurality of pieces, mold assembly 100 may be formed by disposing gauge ring 110 onto mold base 102, for example by threading gauge ring 110 onto mold base 102. Funnel 120 may be disposed onto the top of gauge ring 110 to extend mold assembly 100 to a desired height to hold the matrix materials and binder material as described above. For example, funnel 120 may be threaded onto gauge ring 110. Displacement materials such as, but not limited to, mold inserts 106, legs 142 and 144 and core 150 may then be loaded into mold assembly 100 if not previously placed in cavity 104. Metal blank 36 may be loaded into mold assembly 100.

In an embodiment, a matrix powder may be loaded into mold assembly 100. As described above, a combination of matrix powders may be loaded into mold assembly 100 or a plurality of matrix powders may be loaded into mold assembly 100 in layers or in a graduated fashion to create the desired properties within the finished matrix drill bit. As mold assembly 100 is being filled with matrix materials, a series of vibration cycles may be induced in mold assembly 100 to assist packing of matrix powder 132. The vibrations may help to ensure a consistent density of the matrix powder 132 within a desired range required to achieve desired characteristics for matrix drill bit body 50.

In an embodiment, a filter may be disposed within mold assembly 100. The filter may be located in various locations depending on the nature of the filter and the specific mold assembly 100 used to form the matrix drill bit. In an embodiment shown in FIG. 3, filter 133 may be disposed about core 150 and rest on metal blank 36. In this embodiment, metal blank 36 may support filter 133 during the infiltration process. In some embodiments as shown in FIGS. 4 through 7, one or more filters may be disposed within mold assembly 100 and supported on a ledge in the side of mold assembly 100, supported on a ledge on the metal blank 36, and/or disposed about metal blank 36 and core 150. In some embodiments, the filter may be disposed within or form a part of core 150. In an embodiment, binder material 160 may be placed on top of the filter material. In an embodiment in which the filter is a part of the core, binder material 160 may be disposed within the core. In some embodiments, binder material 160 may be covered with a flux layer (not expressly shown). A cover or lid (not expressly shown) may then be placed over mold assembly 100.

Figure 13:
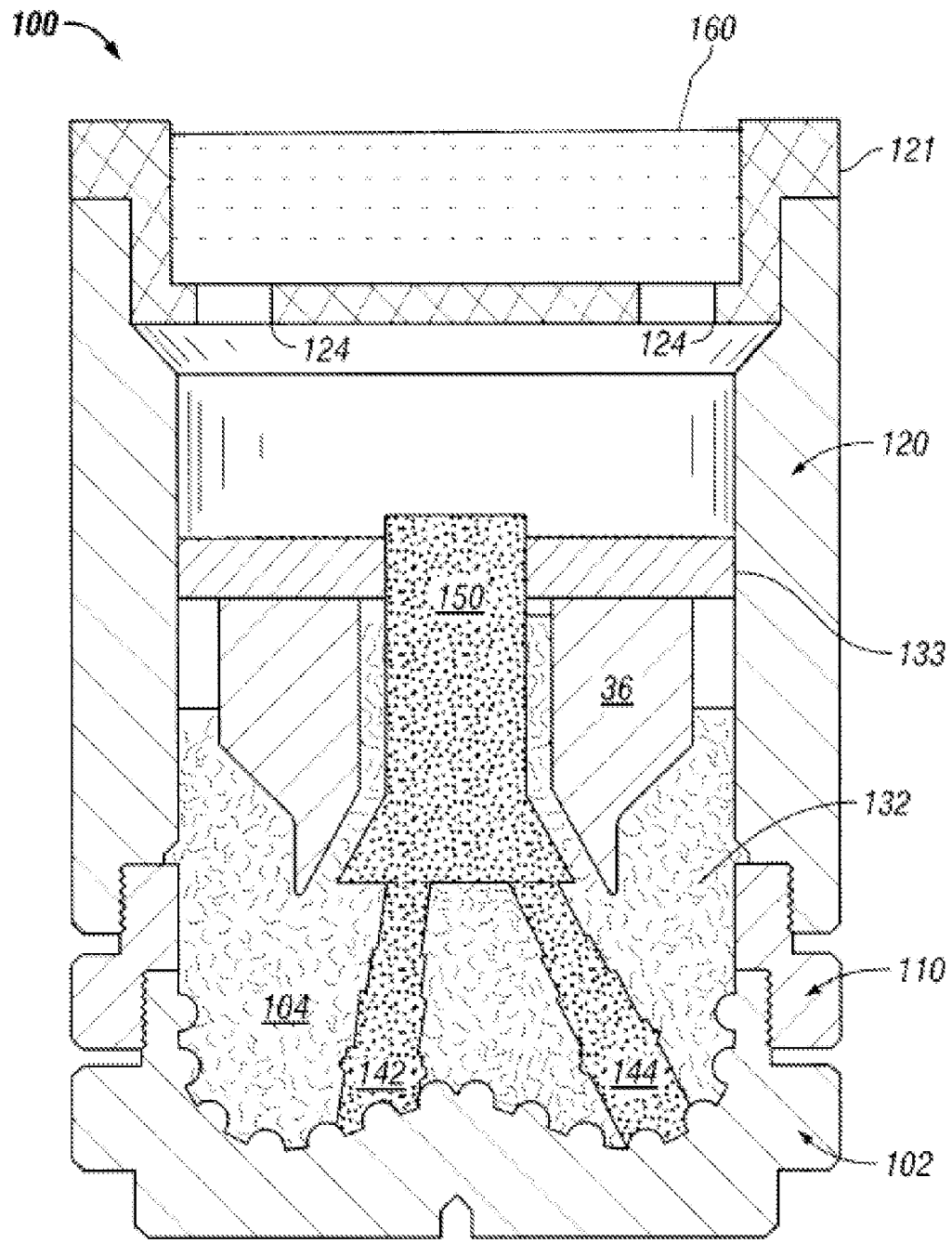
FIG. 13 is still another schematic drawing in section with portions broken away showing one example of a mold assembly satisfactory for forming a matrix drill bit in accordance with the teachings of the present disclosure.

In another embodiment shown in FIG. 13, filter 133 may be disposed about core 150 and rest on metal blank 36. In this embodiment, metal blank 36 may support filter 133 during the infiltration process. In some embodiments as shown in FIGS. 4 through 7, one or more filters may be disposed within mold assembly 100 and supported on a ledge in the side of mold assembly 100, supported on a ledge on metal blank 36, and/or disposed about metal blank 36 and core 150. In some embodiments, the filter may be disposed within or form a part of core 150. Binder material 160 may be placed on top of a binder bowl 121, and optionally may be covered with a flux layer (not expressly shown). A cover or lid (not expressly shown) may then be placed over mold assembly 100. During the infiltration process, molten binder material may flow from the binder bowl, through openings 124 in binder bowl 121, and through the filter disposed within the mold assembly to infiltrate matrix powder 132. In an embodiment in which the filter is a part of the core, a funnel or other flow control device may be used to channel the molten binder material from binder bowl 121 into the center of core 150.

In another embodiment shown in FIGS. 9A, 9B, and 9C, filter 133 is disposed within binder bowl 121, within openings 124, and/or as an integral part with binder bowl 121, as described in more detail above. Binder material 160 may be placed on top of binder bowl 121. Binder material 160 may be covered with a flux layer (not expressly shown). A cover or lid (not expressly shown) may then be placed over mold assembly 100. During the infiltration process, molten binder material may flow from binder bowl 121, through filter 133 disposed within openings 124 in binder bowl 121 to infiltrate matrix powder 132.

In still another embodiment shown in FIG. 10, filter 133 may comprise a loose particulate material to form a bed filter. The filter 133 may be disposed on top of the matrix powder within the mold. In an alternative embodiment (not shown), a filter material comprising a particulate material may be disposed above and supported by a structured filter media (e.g., ceramic foam filter, bonded particle filter, etc.) as one or more filter elements. The structured filter media may in turn be supported by metal blank 36, a ledge in the mold assembly, a ledge in the metal blank, or some other structure within mold assembly 100. Binder material 160 may be placed directly on top of the filter or filters or within a binder bowl. Binder material 160 may be covered with a flux layer (not expressly shown). A cover or lid (not expressly shown) may then be placed over mold assembly 100. During the infiltration process, molten binder material may flow through filter 133 to infiltrate matrix powder 132. If a binder bowl is used to hold the binder material during the infiltration process, the molten binder material may flow from the binder bowl 121, through filter 133 to infiltrate matrix powder 132.

Figure 11:
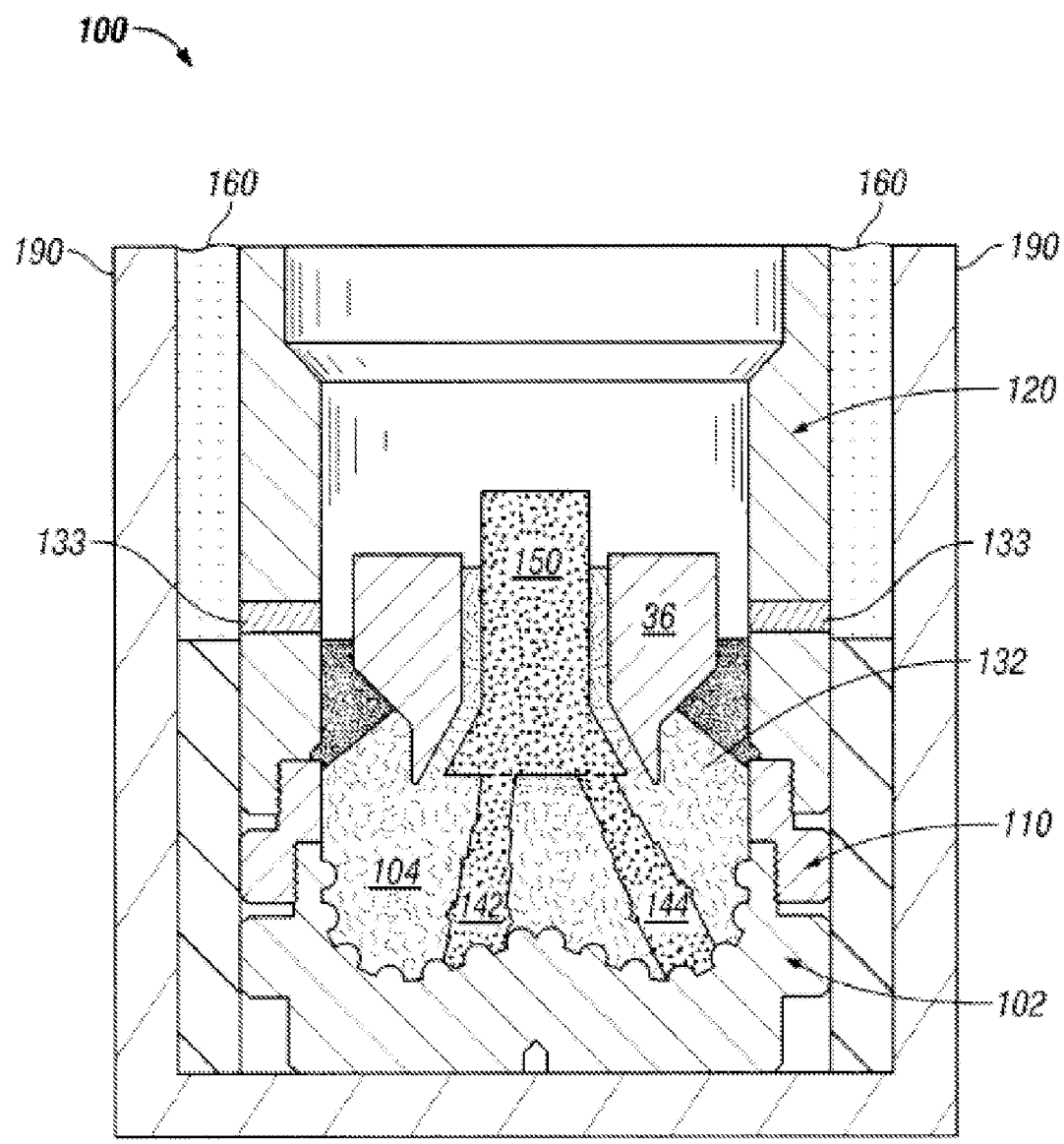
FIG. 11 is another schematic drawing in section with portions broken away showing one example of a mold assembly and an outer mold assembly satisfactory for forming a matrix drill bit in accordance with the teachings of the present disclosure.

In still another embodiment shown in FIG. 11, filter 133 may be disposed in the side of mold assembly 100. The mold assembly may be placed in an outer mold 190 and binder material 160 may be loaded into the annular space created between outer mold 190 and mold assembly 100. Binder material 160 may be covered with a flux layer (not expressly shown). A cover or lid (not expressly shown) may then be placed over mold assembly 100 and outer mold 190. During the infiltration process, molten binder material may flow through filter 133, into the interior of mold assembly 100 to infiltrate matrix powder 132.

In yet another embodiment shown in FIG. 12, filter 133 may be disposed in the side of mold assembly 100. External molten binder material source 192 may be in fluid communication with the exterior surface of filter 133 disposed in mold assembly 100. During the infiltration process, a binder material may be melted in the same or a different furnace and transferred to the mold assembly to flow through filter 133, and into the interior of mold assembly 100 to infiltrate matrix powder 132.

Mold assembly 100 and materials disposed therein (or operably connected thereto) may be preheated and then placed in a furnace (not expressly shown). When the furnace temperature reaches the melting point of binder material 160, molten binder material may infiltrate matrix powder 132. The melting point of the binder may vary depending on the binder material composition, and may generally be in the range of from about 590° C. (1100° F.) to about 1230° C. (2250° F.). A preferred range may be about 815° C. (1500° F.) to about 1230° C. (2250° F.). Proper infiltration and solidification of binder material 160 within matrix powder 132 may be important at locations adjacent to features such as nozzle outlets 54 and pockets 58. Improved quality control from enhanced infiltration of binder material 160 into matrix powder 132 that forms respective blades 52 may allow designing thinner blades 52. Mold assembly 100 may then be removed from the furnace and cooled at a controlled rate. Upper portions of mold assembly 100 such as funnel 120 may have increased insulation (not expressly shown) as compared with mold base 102. As a result, hot, liquid binder material in lower portions of mold assembly 100 will generally start to solidify before hot, liquid binder material in the upper portions of mold assembly 100 solidifies.

It should be noted that cooling may be active (e.g., passing a gas over and/or around the mold assembly or placing the mold assembly in a cooled environment) or passive (e.g., allowing the mold assembly to cool in ambient conditions).

Once cooled, mold assembly 100 may be broken away to expose composite matrix drill bit body 50 as shown in FIG. 14. In some embodiments in which mold assembly 100 comprises a plurality of pieces, some portions of mold assembly 100 may be removed in a manner that allows the reuse of that portion. For example, funnel 120 may be removed and reused in a subsequent infiltration process. Subsequent processing according to well-known techniques may be used to produce matrix drill bit 20. In some embodiments, matrix drill bit 20 may be processed to remove any filter material remaining in the drill bit. For example, if the filter is disposed above metal blank 36 or about metal blank 36, the filter material and any remaining binder material may be removed prior to finishing matrix drill bit 20. As another example, cutting teeth may be disposed in the cutter pockets by brazing after the matrix drill bit is removed from mold assembly 100.

In an embodiment, a method comprises providing a matrix drill bit formed using a matrix drill bit mold comprising a filter according to the present disclosure. The matrix drill bit generally comprises a binder, and a matrix powder. The drill bit also has at least one cutting element for engaging a formation. The drill bit is then used to drill a well bore in a subterranean formation.

In some embodiments of the present invention, a drill bit mold assembly may include a mold cavity having disposed therein an endpoint of a flow path for molten binder material and at least one filter disposed along the flow path before the endpoint of the flow path.

In some embodiments of the present invention, a drill bit mold assembly may include a mold cavity having disposed therein an endpoint of a flow path for molten binder material; at least a portion of at least one piece disposed in the mold cavity; at least one filter disposed along the flow path before the endpoint of the flow path; and a binder bowl operably attached to the mold cavity and disposed along the flow path at or before at least one filter.

In some embodiments of the present invention, a drill bit mold assembly may include a mold cavity having disposed therein an endpoint of a flow path for molten binder material and at least one filter disposed along the flow path before the endpoint of the flow path. The mold cavity may be formed by at least one inner wall of the drill bit mold assembly and an outer wall of a piece disposed in the drill bit mold assembly.

Some embodiments of the present invention may involve placing a matrix powder within the mold cavity; placing a binder material along the flow path before the filter; melting at least a portion of the binder material to form the molten binder material; passing the molten binder material through the filter so as to infiltrate the matrix powder; and cooling (actively or passively) the binder material to form a drill bit. Generally a drill bit mold assembly may include a mold cavity having disposed therein an endpoint of a flow path for a molten binder material and at least one filter disposed along the flow path before the endpoint of the flow path.

To facilitate a better understanding of the present invention, the following examples of preferred embodiments are given. In no way should the following examples be read to limit, or to define, the scope of the invention.

EXAMPLES

Example 1

Two test pins were produced using SEDEX™ filters (ceramic foam filters, available from Foseco) to reduce the inclusions in the resultant pins. A pin mold was produced with a three-tier cavity, shown in FIGS. 15A-D in a cross-sectional view, a top view, a picture without the filter, and a picture with the filter, respectively. The three-tier cavity having a closed bottom and open top has, from bottom to top, a first cylinder having a 1.91 cm (0.75") diameter and a 8.26 cm (3.25") height, a cube having a 2.54 cm (1.00") height and 3.81 cm (1.50") square cross-section, and a second cylinder having a 7.62 cm (3.00") diameter and a 2.54 cm (1.00") height. Overall the pin mold has an outer diameter of 8.89 cm (3.50") and height of 13.97 cm (5.50").

The matrix material of D63 (tungsten carbide powder, available from HC Stark) was loaded into the first cylinder and vibrated to settle the powder. The final tungsten carbide powder level was 5.1 cm (2") in height. Then 0.64 cm (¼") of M70 (tungsten powder, available from HC Stark) was loaded above the tungsten carbide and vibrated to settle. A SEDEX™ filter cut to (0.8") thick by (1.5") square was placed in the second tier (square tier) of the three-tier mold cavity. Clay was placed around the outer edges of the filter to hold the filter in place. In the first mold cavity, approximately 300 g of binder was added on top of the filter. In the second mold cavity, approximately 300 g of binder and 6 grams of Harris 600 flux (borax and boric acid, available from Harris Products) was added on top of the filter. A graphite lid with two 9⁄64" diameter atmosphere exposure holes was then placed on top of the mold.

The molds were placed in a lab furnace preheated to 1150° C. (2100° F.) and held for approximately 1 hour. No atmosphere control was used inside the furnace. Then the molds were removed from the furnace and allowed to cool under ambient conditions. Once cool, the pins were removed from the pin molds.

Figure 16A:
FIG. 16A is a picture of two test pins formed in accordance with the teachings of the present disclosure.
Figure 16B:
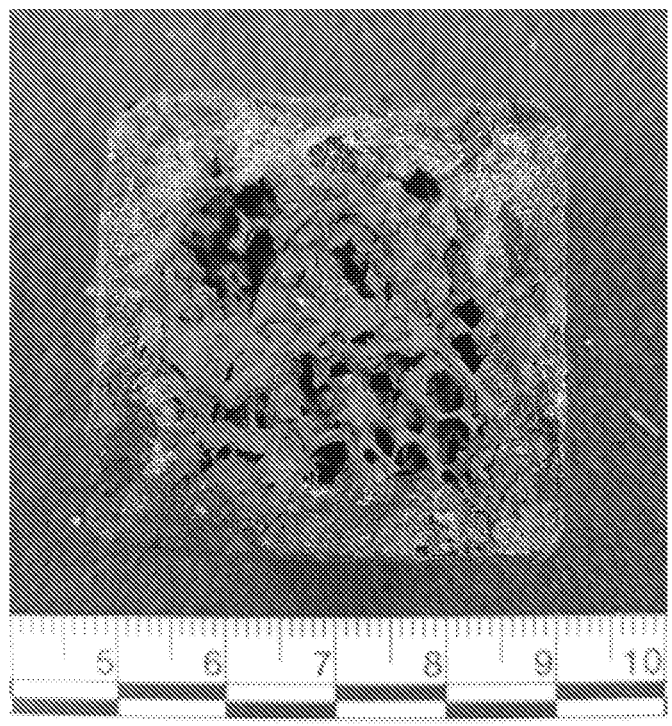
FIG. 16B is a picture of a filter after forming test pins in accordance with the teachings of the present disclosure.

Both pins were successfully infiltrated, final pins shown in FIG. 16A (side view of the resultant pins) and 16B (top view of the second pin showing the filter covered with trapped inclusion material). The filter of the second pin (sample including flux) floated out of the second, square tier during infiltration. However, the filter demonstrated effective trapping of oxides as evidenced by the filter having a reddish material (oxides) trapped in and on the filter.

Scanning electron microscopy (SEM) and electro dispersive spectroscopy (EDS) were performed on portions of the filters after infiltration. Table 1 below provides the EDS data corresponding to the locations analyzed on the sample (labeled as "spots" overlaying the SEM images). Spot #1 corresponds to FIG. 17, which is an SEM micrograph of the filter without any treatment. Spots #2-#3, #4-#5, and #6-#7 correspond to FIGS. 18, 19, and 20, respectively, which are SEM micrographs of different areas of the filter after production of the first pin not using flux. Spots #8-#10, #11-#12, and #13-#14 correspond to FIGS. 21, 22, and 23, respectively, which are SEM micrographs of different areas of the filter after production of the second pin using flux. It should be noted that the samples were not sputter coated before SEM and EDS analysis.

TABLE 1

EDS Analysis of Spots of the SEM Micrographs (Percent Composition)

| Spot | O | Na | Al | Si | S | Ca | Mn | Fe | Ni | Cu | Zn |
|---|---|---|---|---|---|---|---|---|---|---|---|
| New Filter (FIG. 17) | | | | | | | | | | | |
| #1 | 42.28 | 0.61 | 1.37 | 54.94 | | 0.34 | | 0.46 | | | |
| Filter from Pin 1 (no flux used) (FIG. 18) | | | | | | | | | | | |
| #2 | 21.02 | 0.46 | 0.77 | 42.59 | 4.55 | 0.48 | 29.21 | 0.42 | | 0.51 | |
| #3 | 26.55 | | 1.38 | 16.75 | 3.14 | 0.24 | 35.71 | | 3.16 | 11.20 | 1.87 |
| Filter from Pin 1 (no flux used) (FIG. 18) | | | | | | | | | | | |
| #4 | 28.69 | | 2.71 | 11.95 | 2.71 | 0.45 | 45.56 | | 1.38 | 5.56 | 0.99 |
| #5 | 22.58 | 0.59 | 1.17 | 42.91 | 6.93 | 0.26 | 23.72 | 0.66 | 0.37 | 0.82 | |
| Filter from Pin 1 (no flux used) (FIG. 19) | | | | | | | | | | | |
| #6 | 23.00 | | 1.67 | 36.71 | 4.89 | 0.43 | 29.67 | 0.84 | 0.73 | 2.06 | |
| #7 | 20.04 | 0.43 | 0.87 | 19.79 | 1.96 | 0.29 | 55.89 | 0.72 | | | |
| Filter from Pin 2 (flux used) (FIG. 20) | | | | | | | | | | | |
| #8 | 51.29 | 12.85 | 2.04 | 21.57 | 0.61 | 0.37 | 10.77 | | | | 0.50 |
| #9 | 46.64 | 14.20 | 0.70 | 10.49 | 1.49 | 0.32 | 25.58 | | | 0.36 | 0.21 |
| #10 | 41.05 | 21.75 | 0.29 | 4.19 | 11.13 | 0.30 | 20.20 | 0.17 | | | 0.92 |
| Filter from Pin 2 (flux used) (FIG. 21) | | | | | | | | | | | |
| #11 | 39.67 | | | 2.45 | 4.35 | | 41.63 | | | 0.55 | 11.35 |
| #12 | 40.80 | 24.99 | | 1.29 | 6.31 | | 26.17 | | | | 0.43 |
| Filter from Pin 2 (flux used) (FIG. 22) | | | | | | | | | | | |
| #13 | 33.93 | 20.56 | | 1.22 | 10.29 | 0.22 | 33.00 | | | | 0.78 |
| #14 | 40.54 | 19.15 | | 4.46 | 6.77 | 0.16 | 28.34 | | | | 0.58 |

Figure 17:
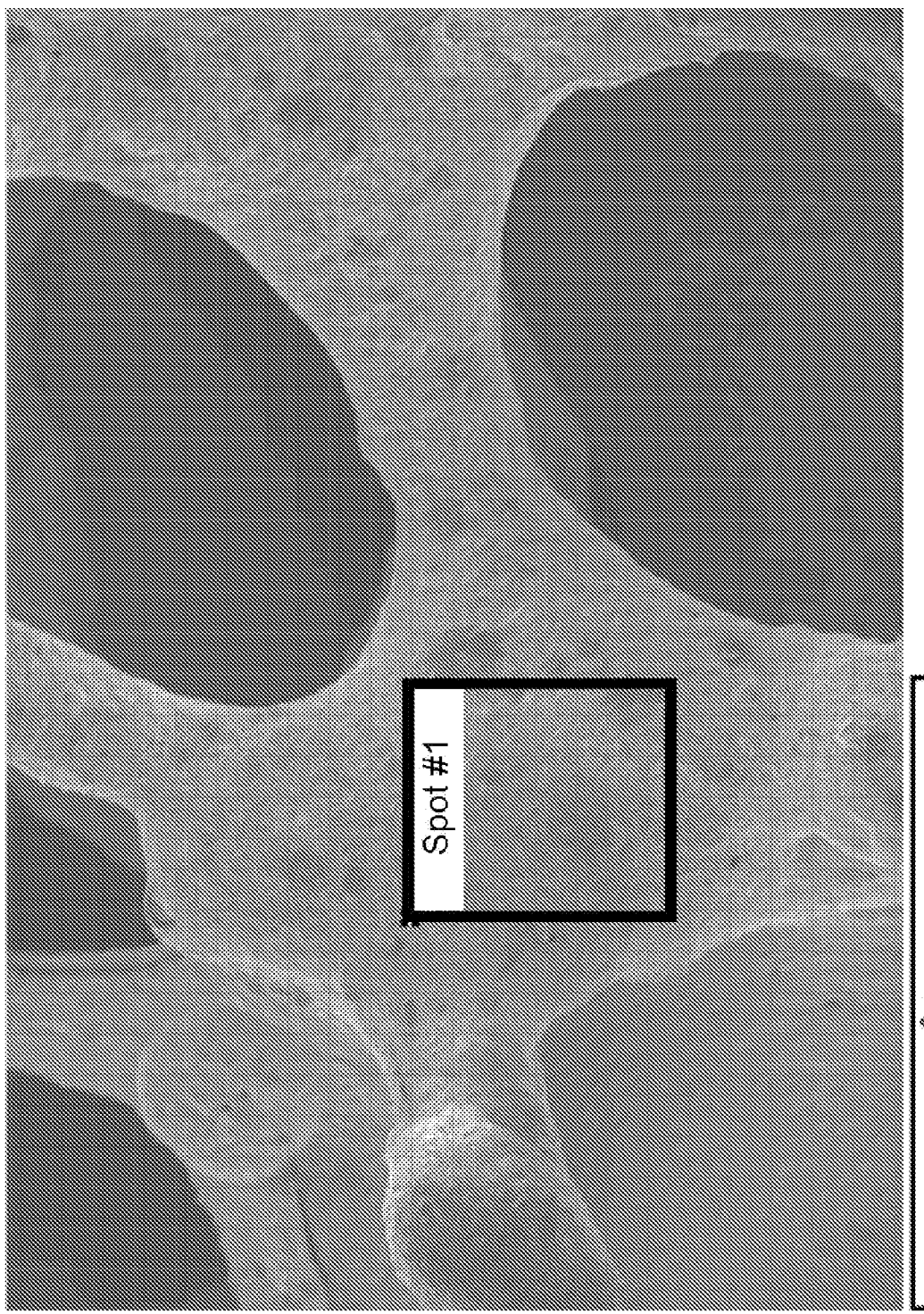
FIG. 17 is a scanning electron micrograph of a filter.
Figure 18:
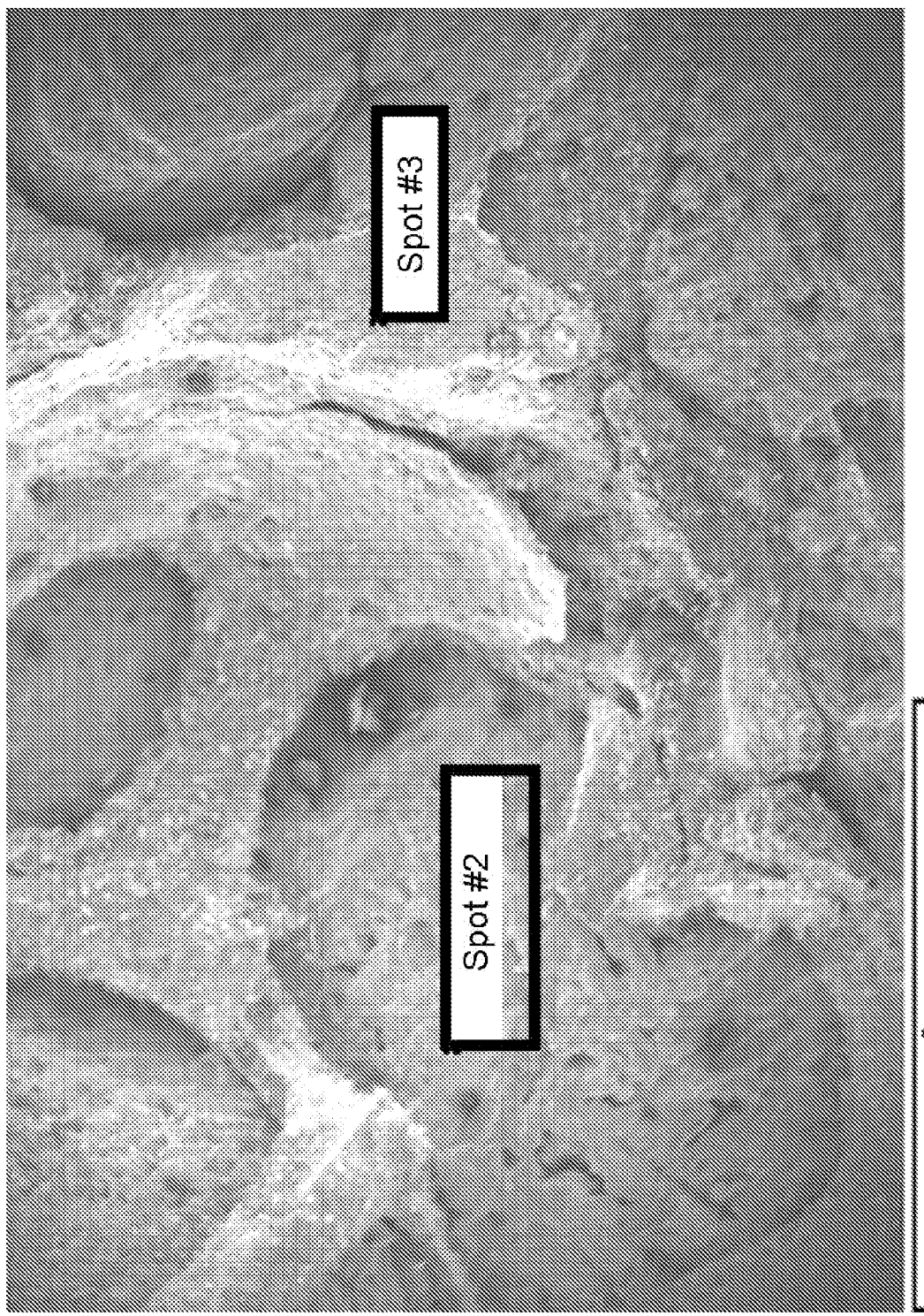
FIG. 18 is a scanning electron micrograph of a filter after forming a test pin in accordance with the teachings of the present disclosure.
Figure 19:
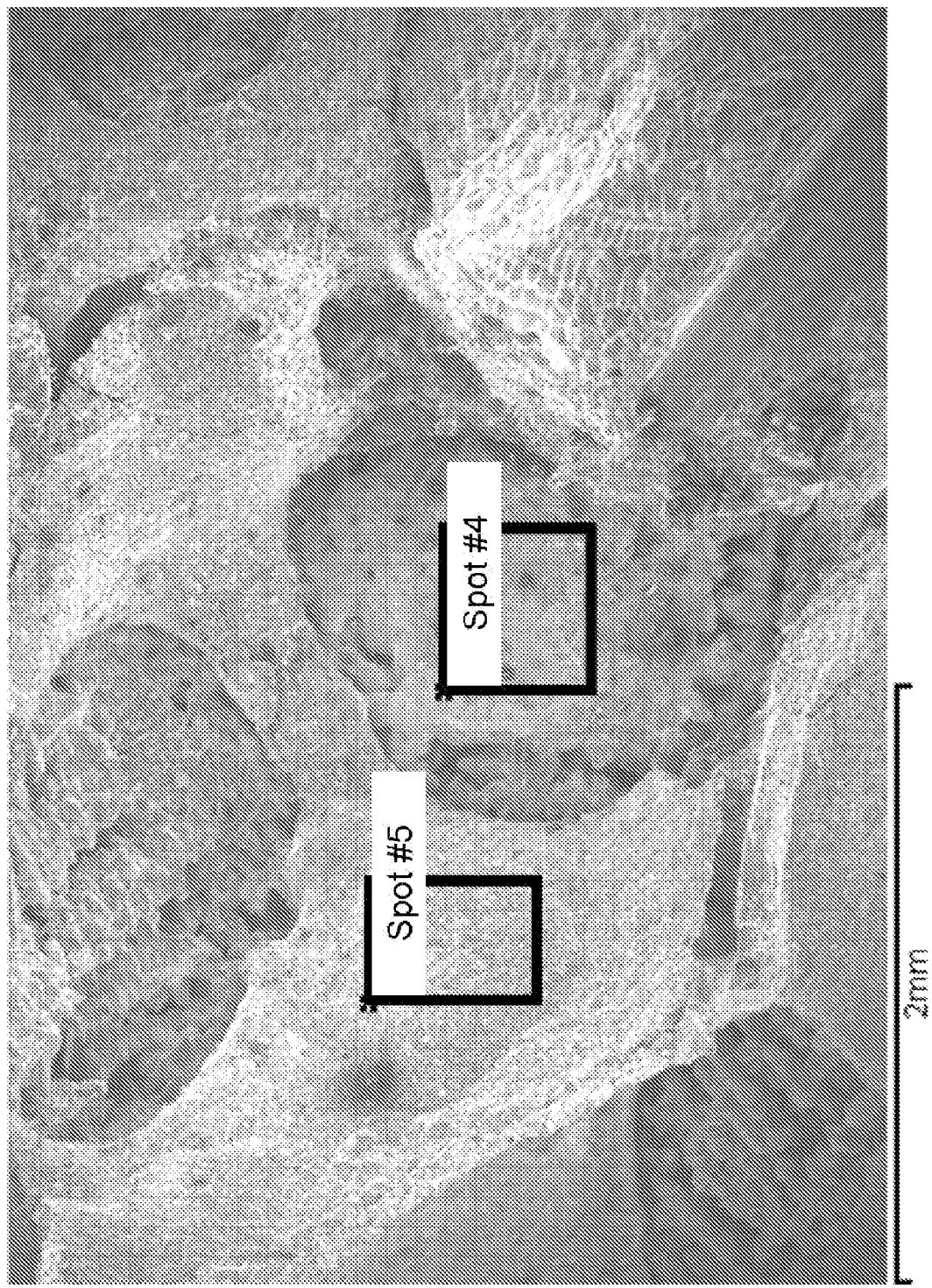
FIG. 19 is a scanning electron micrograph of a filter after forming a test pin in accordance with the teachings of the present disclosure.
Figure 20:
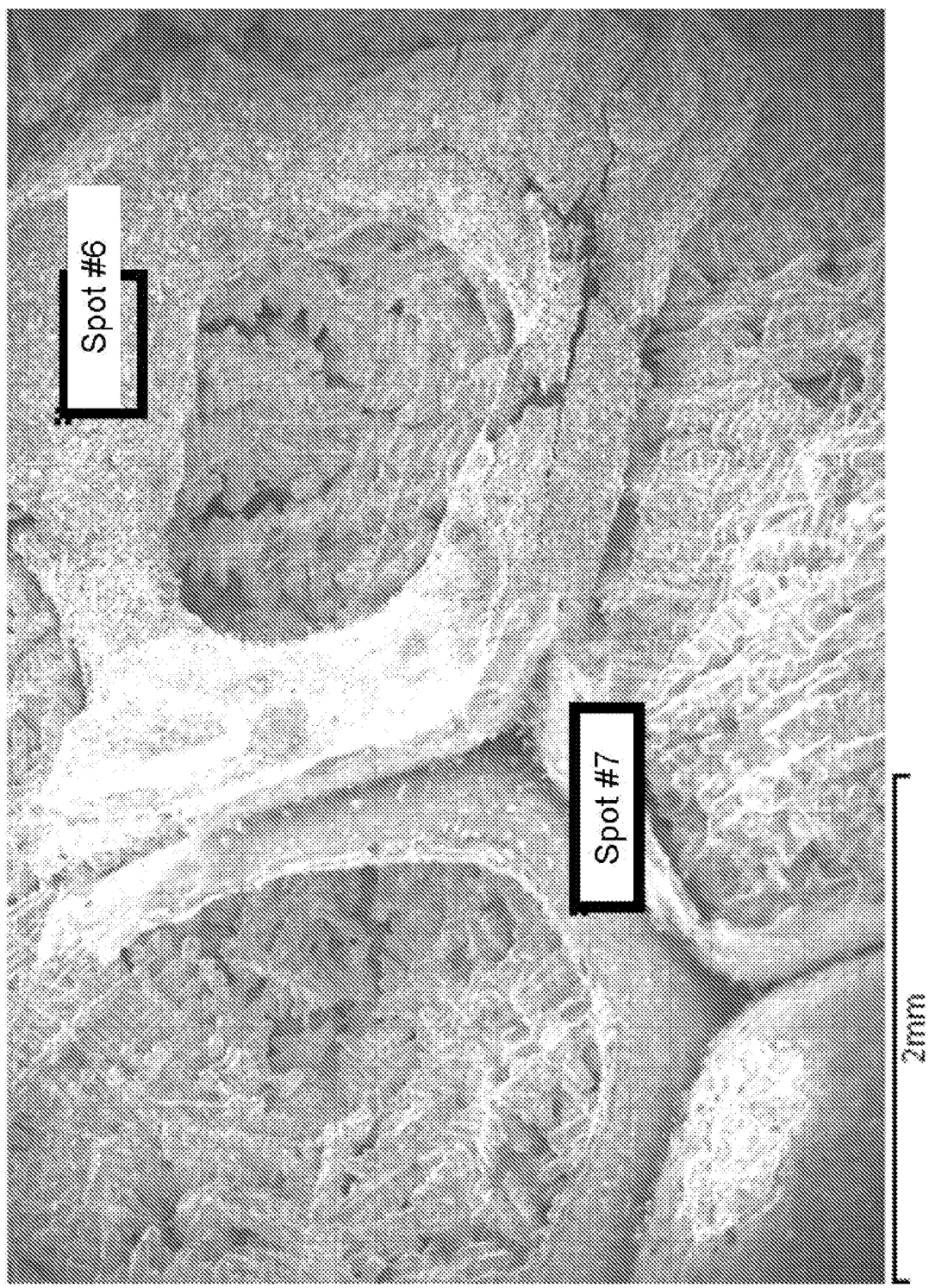
FIG. 20 is a scanning electron micrograph of a filter after forming a test pin in accordance with the teachings of the present disclosure.
Figure 21:
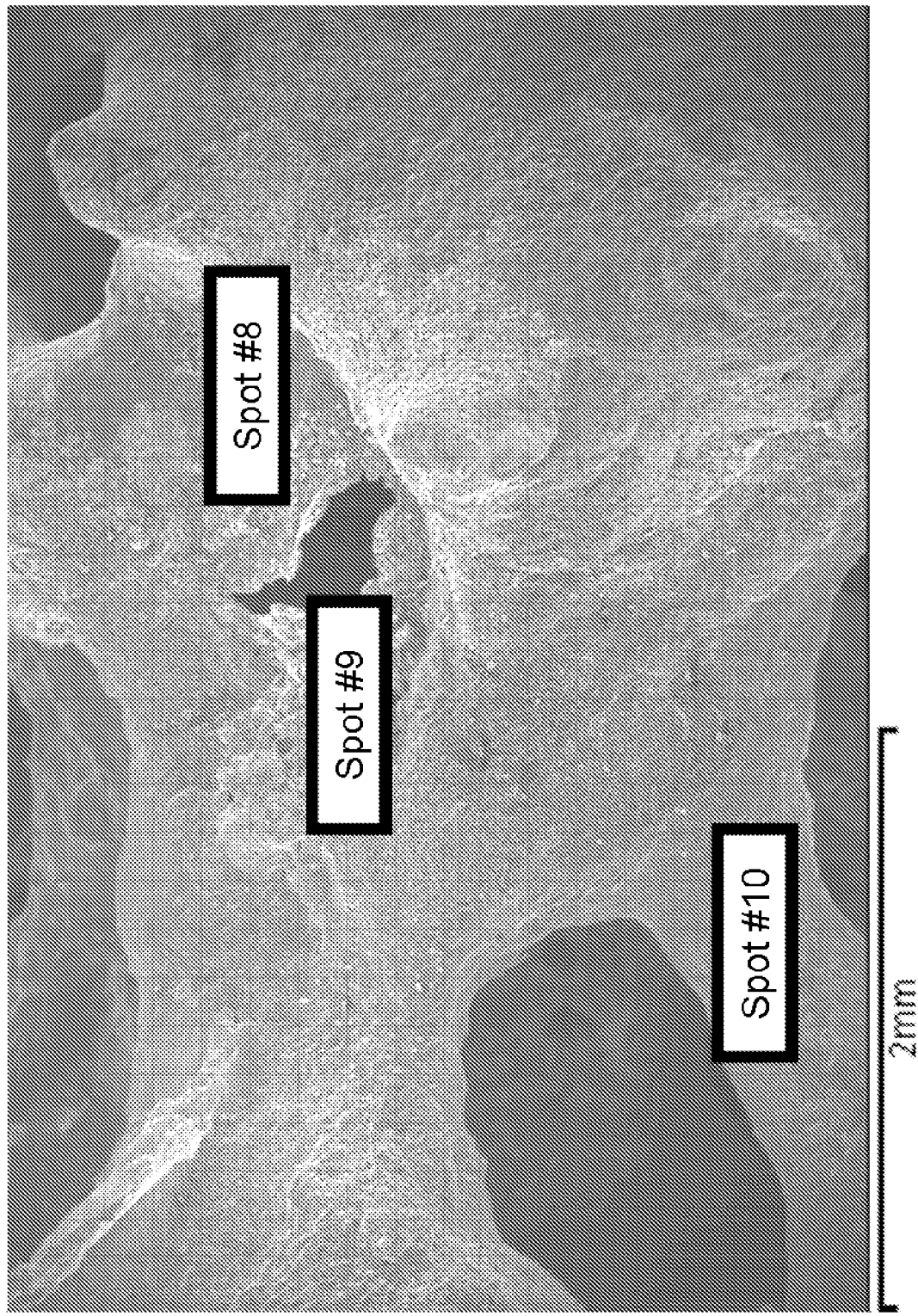
FIG. 21 is a scanning electron micrograph of a filter after forming a test pin in accordance with the teachings of the present disclosure.
Figure 22:
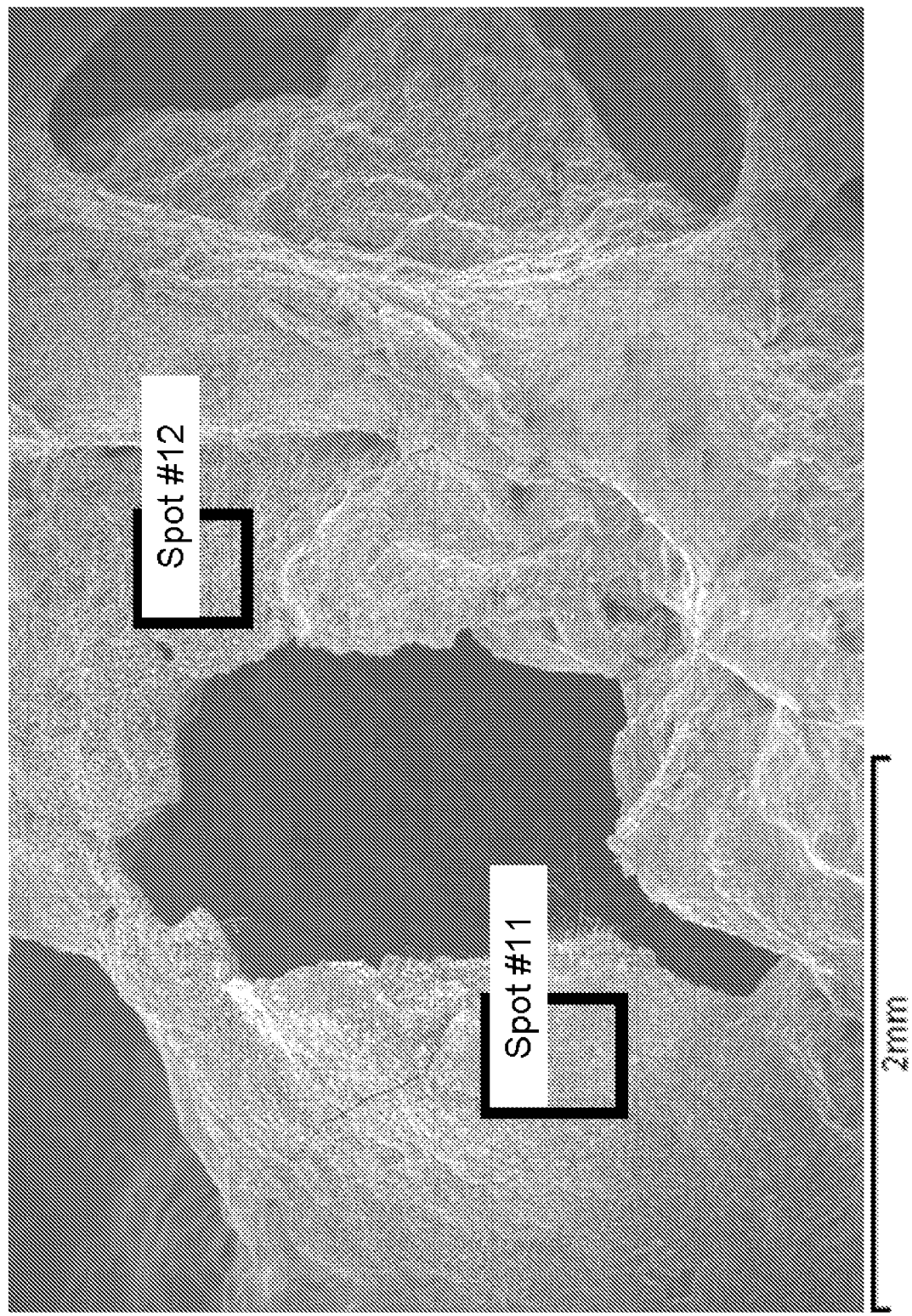
FIG. 22 is a scanning electron micrograph of a filter after forming a test pin in accordance with the teachings of the present disclosure.
Figure 23:
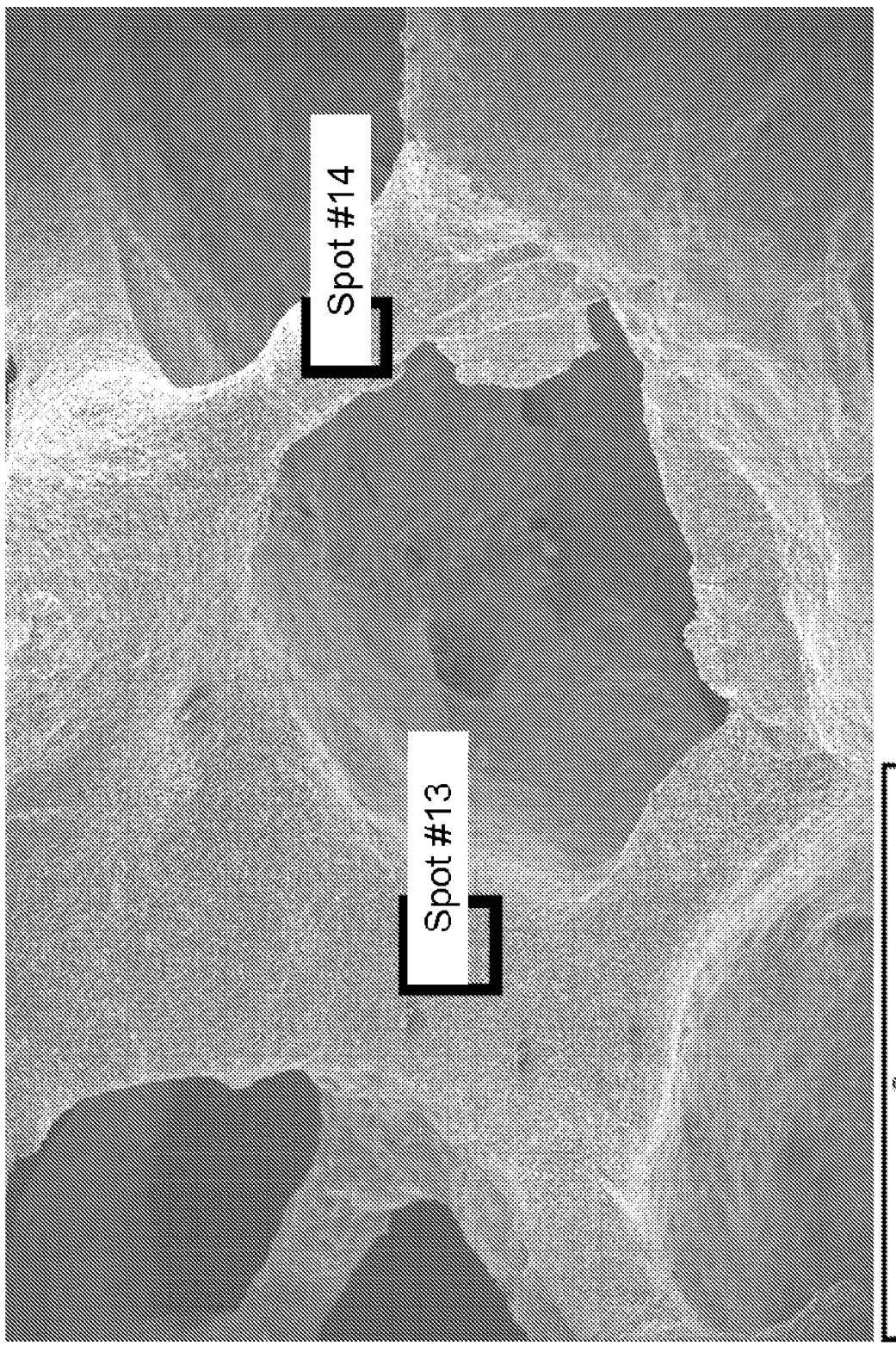
FIG. 23 is a scanning electron micrograph of a filter after forming a test pin in accordance with the teachings of the present disclosure.

The SEM images demonstrate that the filters have trapped material on the surface and in the pores of the filter, shown in FIGS. 18-23 as compared to FIG. 17 (a new filter). The EDS results show the filter having trapped manganese sulfides and magnesium oxides. In pin 2, flux was also trapped by the filters, evident by the increased sodium levels. (It should be noted that boron is not detectable by normal EDS equipment.) Manganese sulfides, magnesium oxides, and flux are primary sources of inclusions. Silicon oxides are another common inclusion but cannot be discerned in these samples from the silicon in the filter material.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    placing a matrix powder within a mold cavity defined by a drill bit mold assembly, wherein the mold cavity provides a flow path for a molten binder material, and wherein a core is arranged within the mold cavity and at least one filter extends radially from the core and is disposed along the flow path before an endpoint of the flow path;
    placing a binder material at a point along the flow path before the at least one filter;
    melting at least a portion of the binder material to form the molten binder material; and
    passing the molten binder material through the at least one filter so as to infiltrate the matrix powder and thereby reducing inclusions during infiltration of the molten binder material.

2. The method of claim 1 further comprising:
    cooling the binder material to form a drill bit.

3. The method of claim 1 further comprising:
    removing any filter material remaining in the drill bit.

4. The method of claim 1, wherein melting involves heating at least a portion of the binder material to a temperature of about 1100° C. to about 1230° C.

5. The method of claim 1, wherein passing the molten binder material through the at least one filter is assisted with pressure.

6. The method of claim 1, wherein the at least one filter comprises a flux.

7. The method of claim 1, wherein the at least one filter comprises a pair of concentric rings.

8. The method of claim 1, wherein the at least one filter comprises at least one of a strainer filter, a cellular filter, a screen filter, a ceramic cloth filter, a bed filter, a bonded particle filter, a ceramic foam filter, and any combination thereof.

9. The method of claim 1, wherein the at least one filter extends radially from the core to an inner wall of the mold cavity.

10. The method of claim 1, wherein a metal blank is further arranged within the mold cavity between the core and an inner wall of the mold cavity, and wherein the at least one filter extends radially from the core to the inner wall of the mold cavity and rests atop the metal blank.

11. The method of claim 1, wherein a metal blank is further arranged within the mold cavity between the core and an inner wall of the mold cavity,
   wherein the at least one filter is a first filter that interposes the core and the metal blank and the drill bit mold assembly further includes a second filter extending radially from the metal blank to the inner wall of the mold cavity and being disposed along the flow path before the endpoint, and
   wherein passing the molten binder material through the at least one filter comprises passing the molten binder material through the first and second filters.

12. The method of claim 11, wherein the first filter and the second filter are concentric.

13. The method of claim 1, wherein an inner wall of the mold cavity defines a ledge and the at least one filter rests on the ledge.

* * * * *